(12) United States Patent
Kitamura et al.

(10) Patent No.: US 7,768,158 B2
(45) Date of Patent: Aug. 3, 2010

(54) CYLINDRICAL LINEAR MOTOR AND A VEHICLE USING THE SAME

(75) Inventors: Masashi Kitamura, Mito (JP); Fumio Tajima, Hitachi (JP); Yusuke Akami, Yokohama (JP); Noriyuki Utsumi, Tokyo (JP); Ken Nakamura, Yokohama (JP); Kazuaki Shibahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 294 days.

(21) Appl. No.: 11/819,130

(22) Filed: Jun. 25, 2007

(65) Prior Publication Data

US 2008/0001483 A1 Jan. 3, 2008

(30) Foreign Application Priority Data

Jun. 26, 2006 (JP) .............................. 2006-174880

(51) Int. Cl.
*H02K 41/035* (2006.01)
*H02K 33/00* (2006.01)

(52) U.S. Cl. .............. 310/12.22; 310/12.04; 310/12.18; 310/12.25

(58) Field of Classification Search .................. 310/12, 310/15; 188/267; 267/140.14
See application file for complete search history.

(56) References Cited

U.S. PATENT DOCUMENTS

| 4,900,054 | A | * | 2/1990 | Kessler | ..................... 280/5.507 |
| 5,301,111 | A | | 4/1994 | Utsui et al. | |
| 5,598,044 | A | * | 1/1997 | Satomi et al. | .................. 310/12 |
| 5,691,582 | A | * | 11/1997 | Lucas et al. | ................... 310/14 |
| 5,910,691 | A | * | 6/1999 | Wavre | .......................... 310/12 |
| 6,236,125 | B1 | * | 5/2001 | Oudet et al. | ............. 310/12.26 |
| 6,354,607 | B1 | * | 3/2002 | Kawashima et al. | ...... 280/5.511 |
| 6,770,989 | B2 | * | 8/2004 | Miyagawa et al. | ........ 310/12.26 |
| 6,831,379 | B2 | * | 12/2004 | Ohto et al. | ..................... 310/12 |
| 6,917,136 | B2 | * | 7/2005 | Thornton et al. | ............ 310/254 |
| 6,949,846 | B2 | * | 9/2005 | Sugita et al. | ............. 310/12.15 |
| 7,170,202 | B2 | * | 1/2007 | Watarai et al. | ................. 310/12 |
| 2003/0111914 | A1 | * | 6/2003 | Miyagawa et al. | ............ 310/12 |
| 2003/0234584 | A1 | * | 12/2003 | Miyata | ........................ 310/12 |
| 2006/0108878 | A1 | * | 5/2006 | Lindberg et al. | .............. 310/12 |
| 2006/0181158 | A1 | * | 8/2006 | Tajima et al. | .................. 310/12 |

FOREIGN PATENT DOCUMENTS

| CN | 1780120 A | | 5/2006 |
| JP | 4-281359 | * | 10/1992 |
| JP | 7-276963 A | | 10/1995 |
| JP | 2004-53003 A | | 2/2004 |
| JP | 2005-020885 A | * | 1/2005 |

* cited by examiner

*Primary Examiner*—Burton Mullins
(74) *Attorney, Agent, or Firm*—Crowell & Moring, LLP

(57) ABSTRACT

A cylindrical linear motor includes a stator and a movable element disposed via a clearance with respect to the stator and movable rectilinearly with respect to the stator. The movable element has a plurality of permanent magnets fixed to a movable element core. The stator salient poles 3b are pitched at τs and the permanent magnets 11 are pitched at τp so that a relationship of $3/4 < \tau p/\tau s < 3/2$ is established.

4 Claims, 15 Drawing Sheets

FIG. 21

| NUMBER OF POLES, P \ NUMBER OF SLOTS, M | 3 | 6 | 9 | 12 | 15 | 18 | 21 | 24 | 27 | 30 |
|---|---|---|---|---|---|---|---|---|---|---|
| 2 | □ | | | | | | | | | |
| 3 | 3-PHASE MOTOR N/A | | | | | | | | | |
| 4 | ◇ | 2□ | | | | | | | | |
| 5 | | $C_2^{-1}$ | | | | | | | | |
| 6 | | 3-PHASE MOTOR N/A | 3□ | | | | | | | |
| 7 | | $C_2^{+1}$ | $C_3^{-2}$ | | | | | | | |
| 8 | | 2◇ | $C_3^{-1}$ | 4□ | | | | | | |
| 9 | | | 3-PHASE MOTOR N/A | 3-PHASE MOTOR N/A | | | | | | |
| 10 | | | $C_3^{+1}$ | $2C_2^{-1}$ | 5□ | | | | | |
| 11 | | | $C_3^{+2}$ | $C_4^{-1}$ | $C_5^{-4}$ | | | | | |
| 12 | | | 3◇ | 3-PHASE MOTOR N/A | 3-PHASE MOTOR N/A | 6□ | | | | |
| 13 | | | | $C_4^{+1}$ | $C_5^{-2}$ | $C_6^{-5}$ | | | | |
| 14 | | | | $2C_2^{+1}$ | $C_5^{-1}$ | $2C_3^{-2}$ | 7□ | | | |
| 15 | | | | 3-PHASE MOTOR N/A | 3-PHASE MOTOR N/A | $3C_2^{-1}$ | 3-PHASE MOTOR N/A | | | |
| 16 | | | | 4◇ | $C_5^{+1}$ | $2C_3^{-1}$ | $C_7^{-5}$ | 8□ | | |
| 17 | | | | | $C_5^{+2}$ | $C_6^{-1}$ | $C_7^{-4}$ | $C_8^{-7}$ | | |
| 18 | | | | | 3-PHASE MOTOR N/A | 3-PHASE MOTOR N/A | 3-PHASE MOTOR N/A | 3-PHASE MOTOR N/A | 9□ | |
| 19 | | | | | $C_5^{+4}$ | $C_6^{+1}$ | $C_7^{-2}$ | $C_8^{-5}$ | $C_9^{-8}$ | |
| 20 | | | | | 5◇ | $2C_3^{+1}$ | $C_7^{-1}$ | $4C_2^{-1}$ | $C_9^{-7}$ | 10□ |
| 21 | | | | | | $3C_2^{+1}$ | 3-PHASE MOTOR N/A | 3-PHASE MOTOR N/A | $3C_3^{-2}$ | 3-PHASE MOTOR N/A |

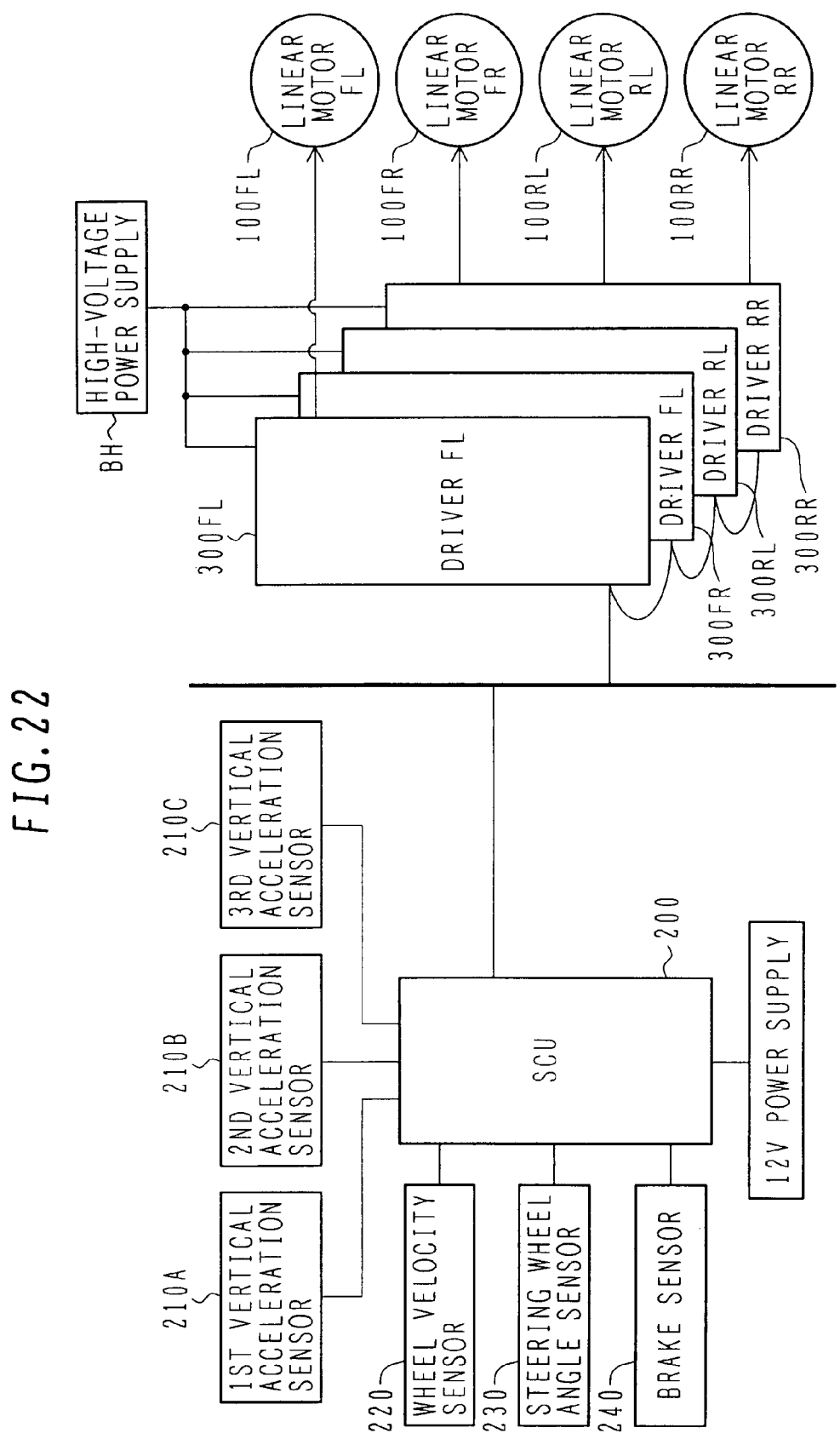

CYLINDRICAL LINEAR MOTOR AND A VEHICLE USING THE SAME

BACKGROUND OF THE INVENTION

1. Field of the Invention

The present invention relates generally to cylindrical linear motors and to vehicles using the same. More particularly, the invention is directed to a permanent magnet type of cylindrical linear motor driven by three-phase alternating-current power, and to a vehicle using the motor.

2. Description of the Related Art

As described in, for example, JP-A-2004-53003, a three-phase synchronous-type cylindrical linear motor is traditionally known. This three-phase synchronous-type cylindrical linear motor is provided with coils on the inner-surface side of the outer casing (stator) of a double-walled enclosure and with permanent magnets on the outer-surface side of the inner casing (movable element) of the enclosure, and does not use a stator core.

Also, JP-A-1995-276963, for example, describes a suspension that uses a three-phase asynchronous-type (induction-type) cylindrical linear motor equipped with a stator core including a set of ring-like spacers, and with a stator including a set of coils.

SUMMARY OF THE INVENTION

The motor described in JP-A-2004-53003 does not have a stator core on the stator side, and employs an airgap winding scheme in which the coils are arranged in a space present between the outer casing and the inner casing. This motor structure has had the problem that the distance between the inner surface of the stator yoke at the outer casing side and the outer surface of each permanent magnet installed on the outer surface of the inner casing is too long to obtain a large thrust force.

Also, the motor described in JP-A-1995-276963 has had the problem that since the motor does not use a permanent magnet on the movable-element side, the motor is low in magnetomotive force and small in thrust force.

In order to obtain a large thrust force, therefore, the present inventors have conducted studies on a three-phase synchronous motor whose stator close to an outer casing has a stator core and whose movable element close to an inner casing has permanent magnets. The present inventors have found, however, that when the inner casing is slid with respect to the outer casing, changes in position of each permanent magnet near the inner casing will cause significant pulsations in the thrust generated. Detent force equivalent to a cogging torque in the rotary-type motor has also been found to increase significantly.

A first object of the present invention is to provide a cylindrical linear motor capable of generating a large thrust force and reducing thrust pulsations, and a vehicle using the motor.

A second object of the present invention is to provide a cylindrical linear motor capable of generating a large thrust force and reducing thrust pulsations and detent force, and a vehicle using the motor.

The present invention is intended to provide a cylindrical linear motor capable of generating a large thrust force and reducing torque pulsations, and a vehicle using the motor.

One of typical major features of the present invention is that the cylindrical linear motor has a magnetic circuit composed so that when salient poles of the stator are pitched at τs and the permanent magnets are pitched at τp, a relationship of 3/4<τp/τs<3/2 is established.

The present invention is also intended to provide a cylindrical linear motor capable of generating a large thrust force and reducing torque pulsations and detent force, and a vehicle using the motor.]

Another typical major feature of the present invention is that a stator core has auxiliary salient poles arranged at both ends of the core so as to further reduce torque pulsations and detent force.

According to the present invention, a large thrust force can be obtained and thrust pulsations reduced. In addition, according to the present invention, a large thrust force can be obtained, and thrust pulsations and detent force can be reduced.

BRIEF DESCRIPTION OF THE DRAWINGS

FIG. 21 is an explanatory diagram of cylindrical linear motor configurations according to the present invention;

FIG. 22 is a system block diagram showing a the configuration of an electromagnetic suspension according to any one of the embodiments of the present invention;

DETAILED DESCRIPTION OF THE PREFERRED EMBODIMENTS

Configurations of a cylindrical linear motor according to a first embodiment of the present invention will be described hereunder using FIGS. 1 to 7. First, the configuration of the cylindrical linear motor in a first example of the present embodiment is described below using FIGS. 1 and 2.

Figure 1:
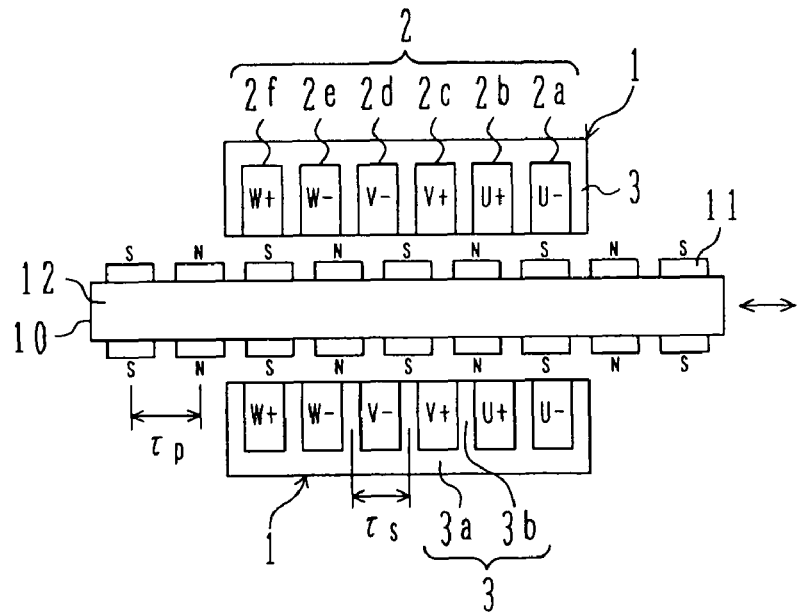
FIG. 1 is a cross-sectional view that shows the configuration of a magnetic circuit in a first example of a cylindrical linear motor according to a first embodiment of the present invention.
Figure 2:
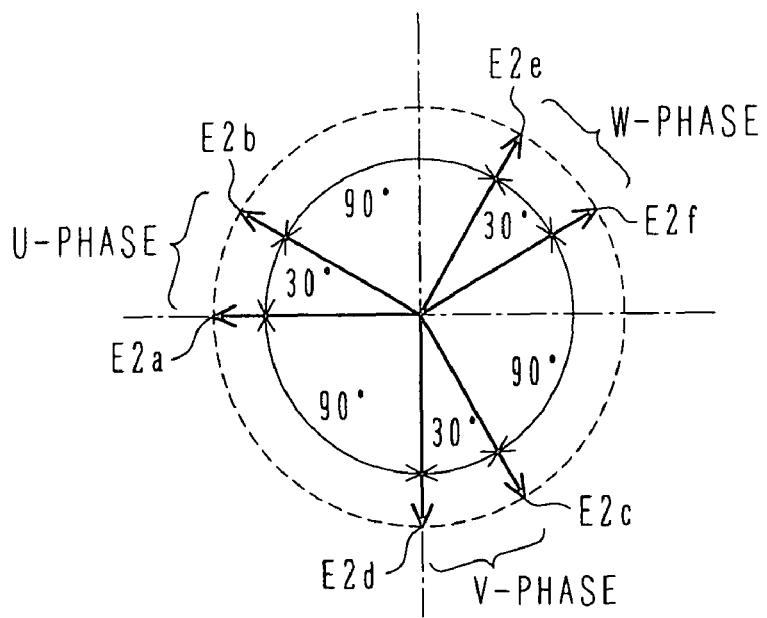
FIG. 2 is an explanatory diagram of induced voltages which occur in stator coil windings at a particular moment during a movement of a movable element at a constant speed in the first example of the cylindrical linear motor according to the first embodiment.

FIG. 1 is a cross-sectional view that shows the configuration of a magnetic circuit in the first example of the cylindrical linear motor according to the present embodiment of the invention. FIG. 2 is an explanatory diagram of induced voltages which occur in stator coil windings at a particular moment during a movement of a movable element at a constant speed in the first example of the cylindrical linear motor according to the first embodiment of the invention.

As shown in FIG. 1, the cylindrical linear motor in the present example includes a stator 1 of a cylindrical shape and a movable element 10 that is disposed at an inner-surface side of the stator 1 via a clearance and movable rectilinearly in an axial direction of the stator 1.

The stator 1 includes a stator core 3 and stator coil winding 2. The stator core 3 includes a stator core yoke 3a and stator core teeth (stator salient poles) 3b. The stator core yoke 3a and the stator core teeth 3b are both made of iron.

A dust core formed by compressing and molding iron particles can be used to construct the stator core yoke 3a and the stator core teeth 3b. Since a resistance value of the stator core yoke 3a and that of each stator core tooth 3b can be increased by using the dust core, eddy current loss occurring in the stator core 3 decreases and efficiency of the cylindrical linear motor in the present example is correspondingly improved.

Next, the configuration of the stator coil winding 2 is described below. Slots are formed by the stator core yoke 3a and each stator core teeth 3b. In the example of FIG. 1, six slots are formed and the stator coil windings 2a (U−), 2b (U+), 2c (V+), 2d (V−), 2e (W−), and 2f (W+) is disposed in the slots. A copper wire whose surface is covered with enamel and which is wound through a plurality of turns to have a shape of a ring is used to form one stator coil winding 2. The stator coil windings 2a (U−) and 2b (U+) constitute a U-phase stator coil, the stator coil windings 2c (V+) and 2d (V−) constitute a V-phase stator coil, and the stator coil windings 2e (W−) and 2f (W+) constitute a W-phase stator coil.

For the U-phase coil, the stator coil winding 2a (U−) is reverse to the stator coil winding 2b (U+) in winding direction, so a direction in which a current flows through the former winding is reverse to a direction in which the current flows through the latter winding. The U-phase stator coil windings 2a (U−) and 2b (U+) are adjacent to each other and are therefore continuous windings. Winding the coils of the same phase continuously in this way minimizes coil-connecting operations and thus improves manufacturing efficiency of the coils. While U-phase stator coil windings 2a (U−) and 2b (U+) have been described, the same also applies to the V-phase and W-phase stator coil windings. The U-phase, V-phase, and W-phase stator coil windings are star(Y)-connected.

Next, the configuration of the movable element 10 is described below. The movable element 10 includes a movable element core 12 and nine permanent magnets 11. The nine permanent magnets 11 have a shape of a ring and are installed at equal intervals spacedly with respect to one another at an outer-surface side of the movable element core 12. The ring-shaped permanent magnets 11 may be formed in a multiple-split fashion in a circumferential direction of a specific permanent magnet 11. The ring-shaped permanent magnets 11 are constructed so that polarity of the surface of each adjacent permanent magnet 11 alternates between an N-pole and an S-pole in an axial direction.

In the present example, nine permanent magnets 11 are used, which allows for an axial movement of the movable element 10 through a required distance. A required airgap exists between the outer-surface side of each permanent magnet 11 and the inner-surface side of the stator core tooth 3b, and the movable element 10 is coupled to the stator 1 via a support mechanism so as to be able to reciprocate inside the stator 1 in an axial direction of the movable element 10 while maintaining a non-contact state.

The cylindrical linear motor shown in FIG. 1 assumes a relationship of $\tau p : \tau s = 6 : 5$, in which $\tau s$ is a center-to-center distance (stator salient pole pitch) between adjacent stator core teeth (stator salient poles) 3b, and $\tau p$ is a center-to-center distance (permanent magnet pitch) between adjacent permanent magnets 11. That is, there is a relationship of $5 \times \tau p = 6 \times \tau s$, which assumes a magnetic circuit having six slots or six salient poles for five poles. Accordingly, the cylindrical linear motor in the present example is termed a 5-pole 6-slot cylindrical linear motor.

As described later herein, repeatedly coupling a basic unit of this magnetic circuit in the axial direction of the movable element 10 with the magnetic circuit taken as a basic unit of the cylindrical linear motor makes it possible to construct a cylindrical linear motor even greater in the number of poles and slots.

Next, induced voltages that occur in the stator coil winding 2 of the 5-pole 6-slot cylindrical linear motor illustrated in FIG. 1 are described below using FIG. 2. FIG. 2 shows induced voltages E2a, E2b, E2c, E2d, E2e, and E2f that occur in the stator coil windings 2a (U−), 2b (U+), 2d (V+), 2d (V−), 2e (W−), and 2f (W+), respectively, at a particular moment during a movement of the movable element 10 at a constant speed. The lengths of arrows in FIG. 2 indicate magnitudes of the induced voltages, and directions of the arrows indicate phases of the induced voltages.

When paying attention to the U-phase, although the induced voltages E2a and E2b occurring in the stator coil windings 2a (U−) and 2b (U+) are of the same magnitude, a voltage phase shift of 30° exists between the two induced voltages. Since the U-phase stator coil windings 2a (U−) and 2b (U+) are continuous windings, the induced voltage occurring in the U-phase coil becomes a vectorial sum of the induced voltages E2a, E2b. This also holds true for the induced voltages occurring in the V-phase coil and the W-phase coil. Consequently, as shown in FIG. 2, the induced voltages occurring in the U-phase, V-phase, and W-phase coils have a phase difference of 120 degrees from one another. This renders the cylindrical linear motor operable as a three-phase synchronous motor.

How interlinked magnetic fluxes flow as a source of the induced voltages in the cylindrical linear motor of the present invention is described below using FIGS. 3 and 4. For ease in the description of how magnetic fluxes interlinked to the stator coil winding 2 will flow, the description below assumes that only a single permanent magnet 11 is magnetized (in other words, it is assumed that no other permanent magnets 11 are magnetized at all).

Figure 3:
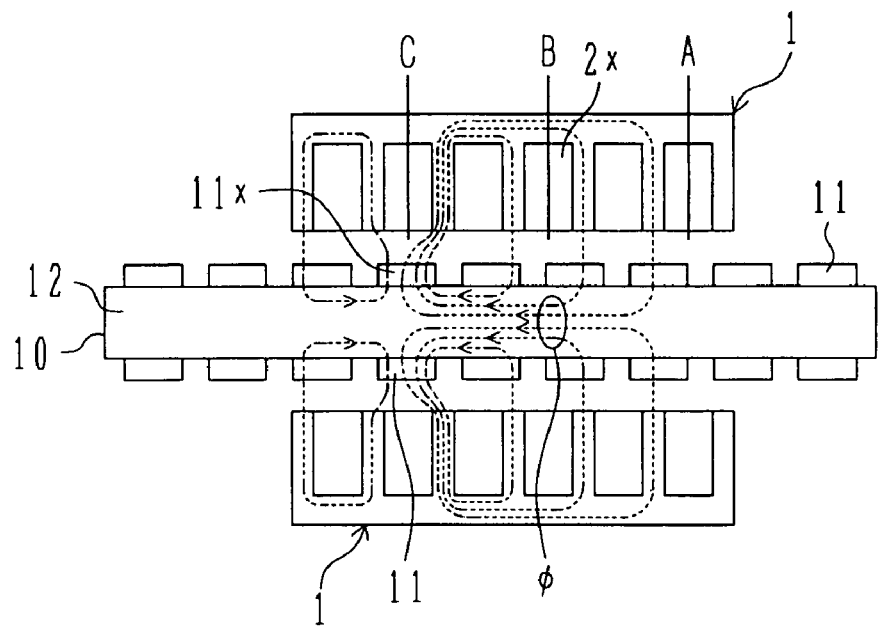
FIG. 3 is a cross-sectional view that shows a flow of inter-linked magnetic fluxes in the first example of the cylindrical linear motor according to the present invention.

FIG. 3 is a cross-sectional view that shows the flow of the interlinked magnetic fluxes in the cylindrical linear motor according to the present invention. FIG. 4 is an explanatory diagram of changes in the interlinked magnetic fluxes of the cylindrical linear motor according to the present invention.

FIG. 3 is a schematic depiction of the way the magnetic fluxes (denoted by wavy lines) will flow when an axial central portion of the single, magnetized permanent magnet 11x is present at a position that agrees with line C in the figure. Symbol φ in the figure denotes magnetic fluxes that are interlinked to the stator coil winding 2x colored in gray. The interlinked magnetic fluxes φ are occurring, even when the magnetized permanent magnet 11x is present at a position away from stator coil winding 2x. The interlinked magnetic fluxes φ are also magnetic fluxes that flow axially within the movable element 10. These properties concerning the interlinked magnetic fluxes φ significantly differ from the characteristics obtained in rotary types of motors which use permanent magnets, or the characteristics obtained in flat-plate types of linear motors which use permanent magnets. That is to say, the above properties characterize the cylindrical linear motor of the present invention.

Figure 4:
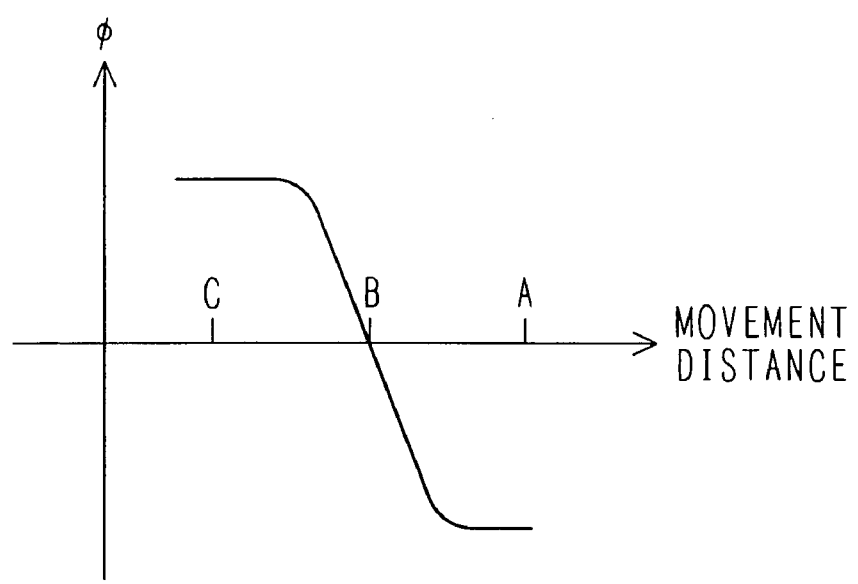
FIG. 4 is a graph showing changes in the interlinked magnetic fluxes of the cylindrical linear motor according to the present invention.

FIG. 4 is a graph showing how the interlinked magnetic fluxes φ will change when the movable element 10 moves from line C, towards line A, with movement distances of the movable element 10 being plotted on a horizontal axis. At a position of line B, positions of the permanent magnet 11x and the stator coil winding 2x agree with each other and the interlinked magnetic fluxes φ become zero. When the permanent magnet 11x moves past the position of line B and arrives at the position of line A, a sign of the interlinked magnetic fluxes φ reverses, as is obvious from the flow pattern of the fluxes that is shown in FIG. 3. These changes in the interlinked magnetic fluxes φ are also characteristic ones of the cylindrical linear motor in the present invention.

Although the example shown in FIG. 1 relates to the cylindrical linear motor having five poles and six slots as the basic unit of the magnetic circuit (τp:τs=6:5), the cylindrical linear motor may be of a 7-pole 6-slot configuration with six slots for seven poles (τp:τs=6:7). The two kinds of cylindrical linear motors with a 6±1 pole arrangement for six slots (τp:τs=6:6±1) are electrically in a relationship of twins, wherein the layout of the U-phase, V-phase, and W-phase stator coil windings 2a to 2f, and the phase relationship of the induced voltages occurring in each stator coil winding 2a-2f become the same.

Repeatedly coupling the above-described cylindrical linear motor in the axial direction of the movable element 10 makes it possible to construct a cylindrical linear motor even greater in the number of poles and slots.

Next, the configuration of a cylindrical linear motor in a second example of the present embodiment is described below using FIGS. 5 and 6.

Figure 5:
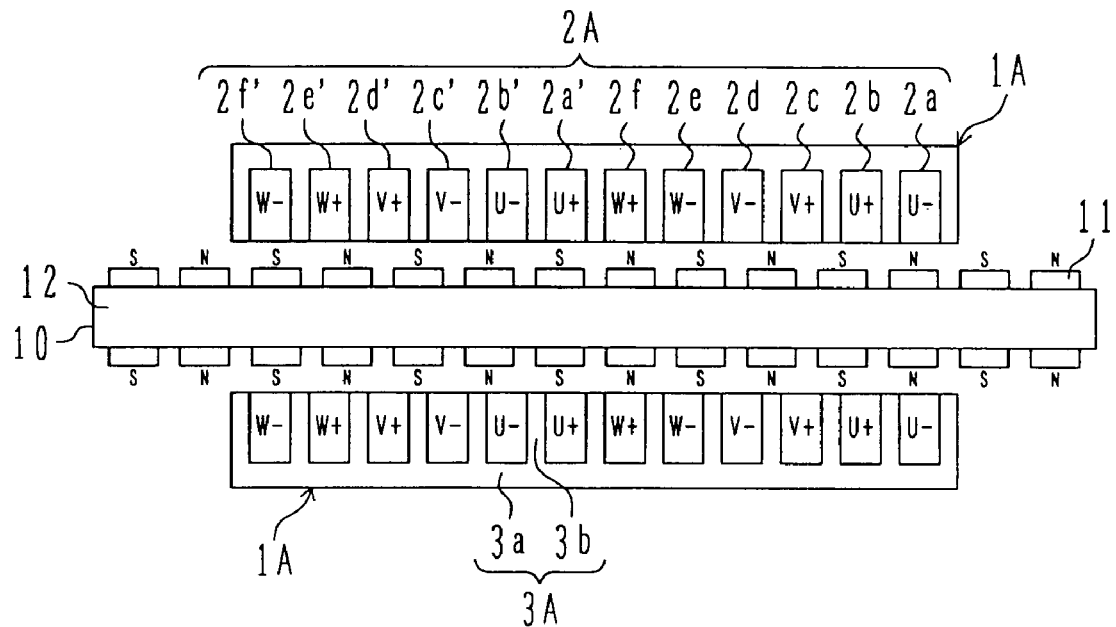
FIG. 5 is a cross-sectional view that shows the configuration of a magnetic circuit in a second example of the cylindrical linear motor according to the first embodiment of the present invention.

FIG. 5 is a cross-sectional view that shows the configuration of a magnetic circuit in the second example of the cylindrical linear motor according to the present embodiment of the invention. FIG. 6 is an explanatory diagram of induced voltages which occur in stator coil windings at a particular moment during a movement of a movable element at a constant speed in the second example of the cylindrical linear motor according to the first embodiment of the invention.

FIG. 5 shows the configuration of the magnetic circuit of the 10-pole 12-slot cylindrical linear motor obtained by repeatedly coupling the 5-pole 6-slot cylindrical linear motor (magnetic circuit basic unit) of FIG. 1 twice in an axial direction. A stator 1A includes a stator coil winding 2A and a stator core 3A. When paying attention to the stator coil winding 2A, stator coil windings 2a (U−), 2b (U+), 2c (V−), 2d (V+), 2e (W−), 2f (W+) are associated with a basic unit of a first magnetic circuit, and stator coil windings 2a' (U+), 2b' (U−), 2c' (V−), 2d' (V+), 2e' (W+), 2f' (W−) are associated with a basic unit of a second magnetic circuit. In the first and second stator coil windings, a current flows in directions reverse to each other. This design consideration on the windings is required because the number of poles in the basic unit of the magnetic circuit is five (odd). This means that if, in terms of polarity, the surfaces of permanent magnets 11 in the basic unit of the first magnetic circuit begin with an S-pole and end with the S-pole, the surfaces of permanent magnets 11 in the basic unit of the second magnetic circuit next to the first one begin with an N-pole and end with the N-pole. As a result, the direction of the current must be reversed to generate a thrust force in the same direction.

Figure 6:
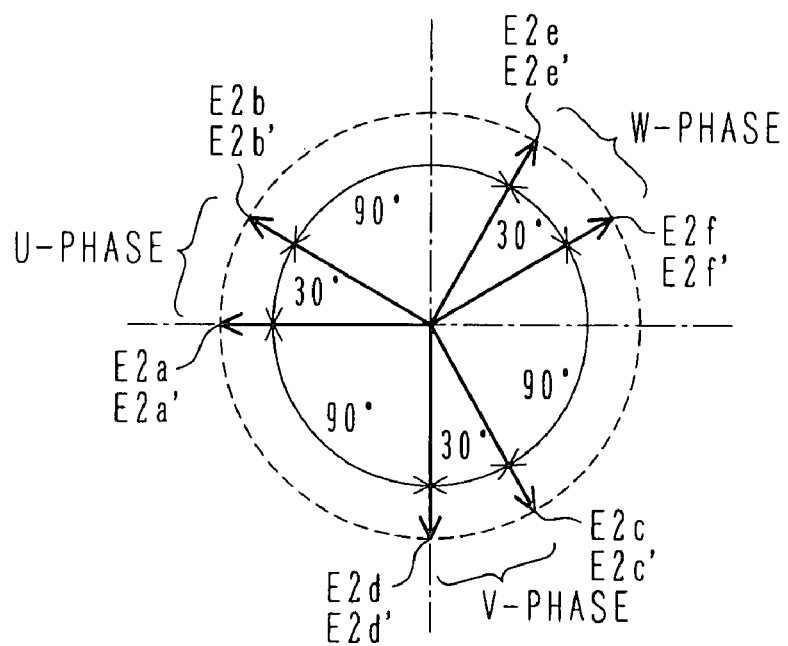
FIG. 6 is an explanatory diagram of induced voltages which occur in stator coil windings at a particular moment during a movement of a movable element at a constant speed in the second example of the cylindrical linear motor according to the first embodiment of the present invention.

FIG. 6 shows the induced voltages E2a, E2b, E2c, E2d, E2e, and E2f occurring in the first stator coil windings 2a (U−), 2b (U+), 2d (V+), 2d (V−), 2e (W−), and 2f (W+), respectively, at a particular moment during the movement of the movable element 10 at a constant speed. FIG. 6 also shows the induced voltages E2a', E2b', E2c', E2d', E2e', and E2f' occurring in the second stator coil windings 2a'(U+), 2b' (U−), 2c' (V−), 2d' (V+), 2e' (W+), 2f' (W−), respectively. Vectors denoting the induced voltages relating to the first and second stator coil windings are in complete agreement. This indicates that when the U-phase, V-phase, and W-phase coil windings are star (Y)-connected, the first and second windings of respective phase coils can also be connected in parallel.

As shown in FIG. 5, although the 5-pole 6-slot cylindrical linear motor shown in FIG. 1 can be used to construct a 10-pole 12-slot cylindrical linear motor, coupling the 5-pole 6-slot cylindrical linear motor in the axial direction of the movable element 10 repeatedly, for example, three times, four times, or more often as necessary, makes constructible a cylindrical linear motor of a 15-pole 18-slot, 20-pole 24-slot, or any other arrangement, respectively (in all cases, τp:τs=6:5). However, as described above, the direction of the current flowing into each phase coil must be reversed each time the basic unit of the magnetic circuit in the 5-pole 6-slot arrangement is coupled. A cylindrical linear motor of, for example, a 14-pole 12-slot, 21-pole 18-slot, or any other arrangement (in all cases, τp:τs=6:7), can likewise be constructed by using a 7-pole 6-slot cylindrical linear motor that is electrically in a relationship of twins with respect to the 5-pole 6-slot cylindrical linear motor.

Next, thrust and detent characteristics of the 5-pole 6-slot cylindrical linear motor according to the present embodiment are described below using FIGS. 7A to 7D.

FIGS. 7A-7D are explanatory diagrams that show advantageous effects of the 5-pole 6-slot cylindrical linear motor according to the first embodiment of the present invention.

Figure 7A:
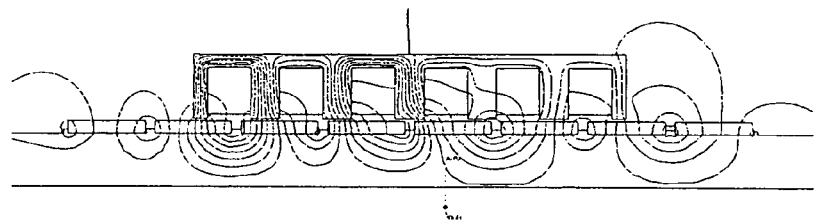
FIGS. 7A-7D are explanatory diagrams that show advantageous effects of the 5-pole 6-slot cylindrical linear motor according to the first embodiment of the present invention.
Figure 7B:
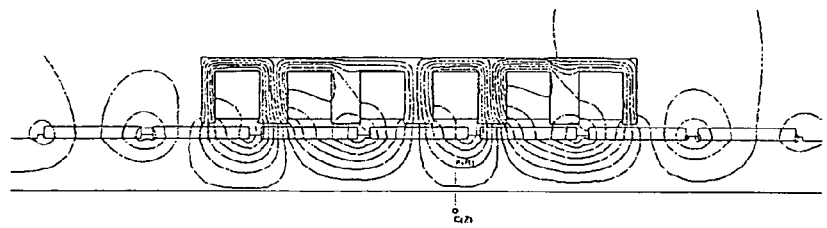

FIG. 7A shows analytical results on a magnetic field (distribution of magnetic flux lines) of the 5-pole 6-slot cylindrical linear motor according to the present embodiment. FIG. 7B shows, as a comparative example, analytical results on a magnetic field (distribution of magnetic flux lines) of a 4-pole 6-slot cylindrical linear motor.

Figure 7C:
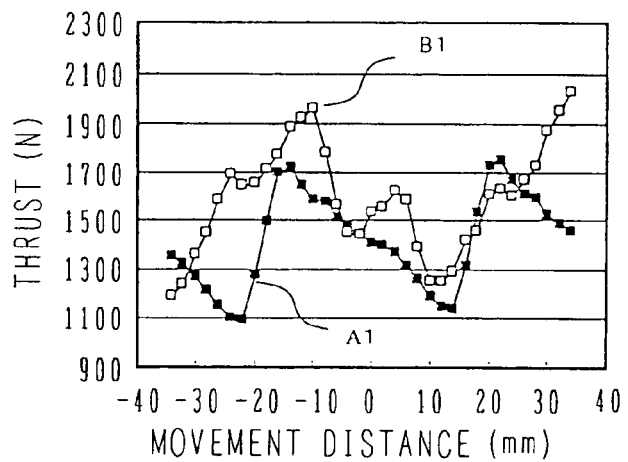

A horizontal axis in FIG. 7C denotes changes in movement distance (mm) of the movable element 10, and a vertical axis denotes cylindrical linear motor thrust value (N) calculations based on the magnetic field analyses. Line A1 in the figure represents a thrust waveform of the 5-pole 6-slot cylindrical linear motor according to the present embodiment. Also, line B1 represents a thrust waveform of the 4-pole 6-slot cylindrical linear motor, associated with the comparative example. In comparison between lines A1 and B1 in FIG. 7C, subtle changes in thrust with vectors of the movable element 10 (i.e., higher-order pulsation components) are included in line B1, and the amplitude of the thrust waveform, shown as line A1, correspondingly become smaller than the amplitude of the thrust waveform, shown as line B1.

Figure 7D:
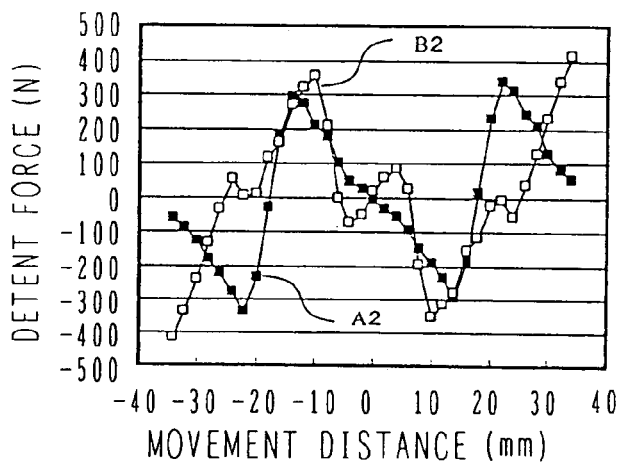

Additionally, a horizontal axis in FIG. 7D denotes changes in movement distance (mm) of the movable element 10, and a vertical axis denotes cylindrical linear motor detent force (N) calculations based on the magnetic field analyses, N being equivalent to a cogging torque in a rotary-type motor. Line A2 in the figure represents a detent force waveform of the 5-pole 6-slot cylindrical linear motor according to the present embodiment. Also, line B2 represents a detent force waveform of the 4-pole 6-slot cylindrical linear motor, associated with the comparative example. In comparison between lines A2 and B2 in FIG. 7D, essentially the same quantity of higher-order pulsation components as in line B1 are included in line B2, and the amplitude of the detent force waveform that is denoted as line A2 correspondingly becomes smaller than the amplitude of the detent force waveform that is denoted as line B2.

As described above, the present embodiment makes it possible to enhance utilization efficiency of magnetic fluxes based on permanent magnets, and minimize the amplitude of the thrust waveform with minimum higher-order pulsation components in the thrust, by composing the magnetic circuit of the cylindrical linear motor so that when salient poles of the stator in the motor are pitched at τs and the permanent magnets are pitched at τp, the relationship of τp:τs=6:6±1 is established.

In the above cylindrical linear motor of the τp:τs=6:6±1 arrangement, since the stator coil windings 2 of the same phase are arranged adjacently to each other, the in-phase coils can be continuously wound. Consequently, man-hour requirements for the coil-connecting operations are reduced, which, in turn, improves manufacturing efficiency of the motor.

Next, the configuration of a cylindrical linear motor according to a second embodiment of the present invention is described below using FIGS. 8 to 10A-10D.

Figure 8:
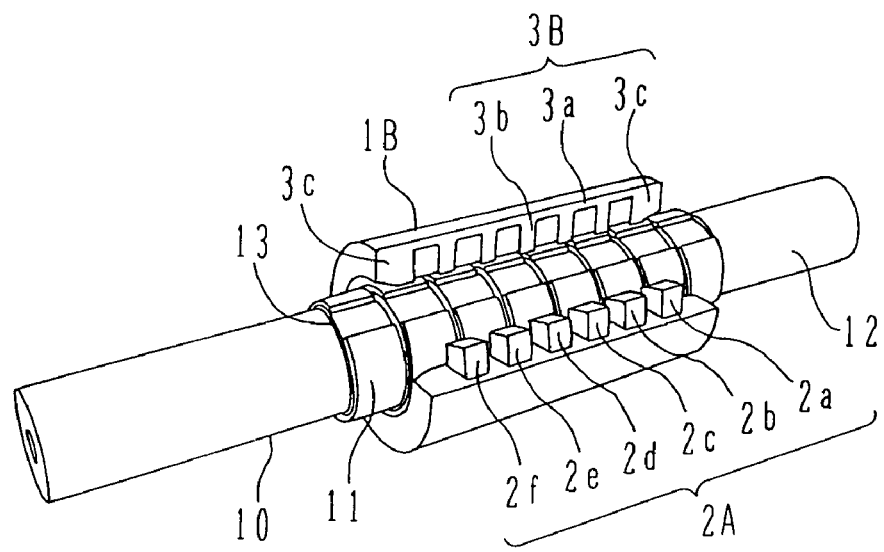
FIG. 8 is a cutaway outline view showing a cylindrical linear motor according to a second embodiment of the present invention.
Figure 9:
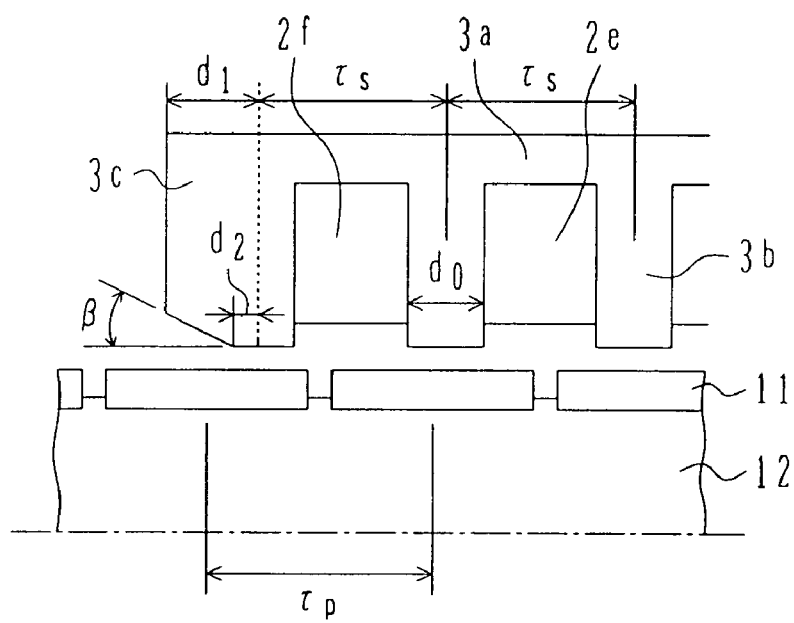
FIG. 9 is a cross-sectional view of the cylindrical linear motor according to the second embodiment of the present invention.

FIG. 8 is a cutaway external view showing the cylindrical linear motor according to the second embodiment of the present invention. FIG. 9 is a cross-sectional view of the cylindrical linear motor according to the second embodiment of the present invention. The same reference numbers and symbols as used in FIG. 1 denote the same sections shown therein. FIGS. 10A-10D are explanatory diagrams that show advantageous effects of the 5-pole 6-slot cylindrical linear motor according to the second embodiment of the present invention.

As shown in FIGS. 8 and 9, stator 1B includes a stator coil winding 2A and a stator core 3B. The stator core 3B includes a body stator core having an axially periodic structure at a stator salient pole pitch τs and formed up of a stator core yoke 3a and stator core teeth (stator salient poles) 3b. The stator core 3B also includes auxiliary salient poles 3c of the same shape, provided at both axial ends of the body stator core. The auxiliary salient poles 3c have a shape of a truncated cone, and their axial length is d1. Contact faces of the auxiliary salient poles 3c with respect to the body stator core are cylindrical and have axial length d2. Inner surfaces of the auxiliary salient poles 3c are molded into the shape of a truncated cone so as to form an angle β.

To smooth the thrust waveform and the detent force waveform, there is a need to adjust the axial length d2 and the angle β to respective optimum values.

The optimum values of the axial length d2 and the angle β are calculated by repeating magnetic field analyses while varying the auxiliary salient poles 3c in terms of shape with d2 and β as parameters, and minimizing the pulsation components in the thrust waveform and the detent force waveform. The optimum value of the angle β is roughly 20°, and the optimum value of the axial length d2 is about several fractions of axial length of each stator core tooth (stator salient pole) 3b.

The auxiliary salient poles 3c of the stator core 3B, provided at both axial ends of the body stator core, are intended to cause smoother changes in magnetic fluxes at both ends of the stator core 3B. The thrust waveform and detent force waveform described using FIGS. 7C and 7D can be smoothed by providing the auxiliary salient poles 3c.

FIGS. 10A-10D collectively show comparison results on characteristics of the 4-pole 6-slot cylindrical linear motor which is a comparative example having the auxiliary salient poles 3c of an optimal shape, and on characteristics of the 5-pole 6-slot cylindrical linear motor according to the present embodiment when this motor also has auxiliary salient poles 3c of the optimal shape.

Figure 10A:
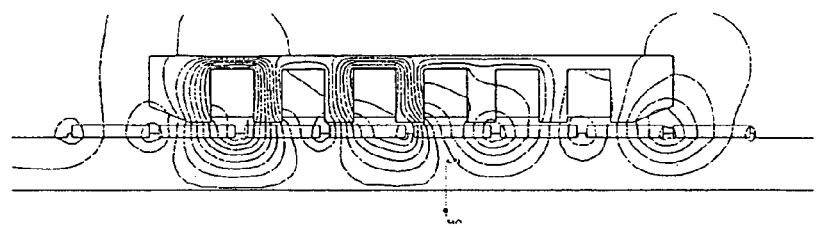
FIGS. 10A-10D are explanatory diagrams that show advantageous effects of the 5-pole 6-slot cylindrical linear motor according to the second embodiment of the present invention.
Figure 10B:
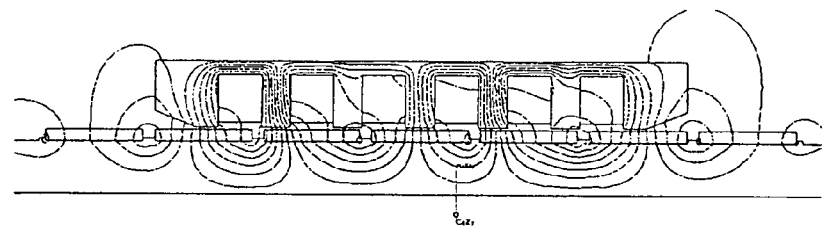

FIG. 10A shows analytical results on a magnetic field (distribution of magnetic flux lines) of the 5-pole 6-slot cylindrical linear motor having auxiliary salient poles 3c in the present embodiment. FIG. 10B shows analytical results on a magnetic field (distribution of magnetic flux lines) of the 4-pole 6-slot cylindrical linear motor having auxiliary salient poles 3c in the comparative example.

Figure 10C:
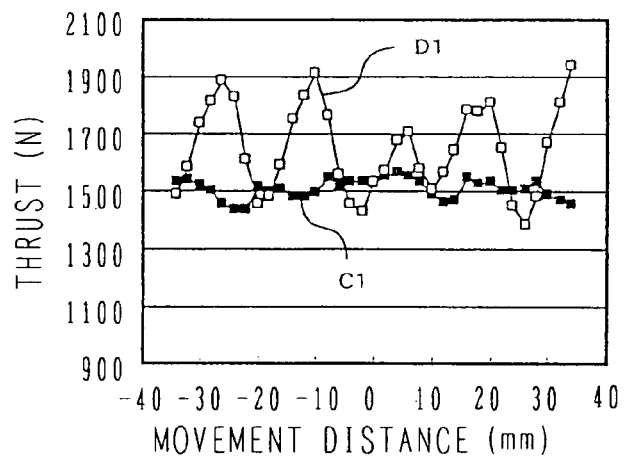

A horizontal axis in FIG. 10C denotes changes in movement distance (mm) of the movable element 10, and a vertical axis denotes cylindrical linear motor thrust value (N) calculations based on the magnetic field analyses. Line C1 in the figure represents a thrust waveform of the 5-pole 6-slot cylindrical linear motor having auxiliary salient poles 3c in the present embodiment. Also, line D1 represents a thrust waveform of the 4-pole 6-slot cylindrical linear motor having auxiliary salient poles 3c in the comparative example.

FIG. 10C indicates that whereas the 5-pole 6-slot cylindrical linear motor with auxiliary salient poles 3c in the present embodiment creates a flat thrust waveform, the 4-pole 6-slot cylindrical linear motor with auxiliary salient poles 3c in the comparative example creates a thrust waveform in which the higher-order pulsation components shown in FIG. 7C remain intact. That is to say, a significant difference in flatness exists between both waveforms.

Figure 10D:
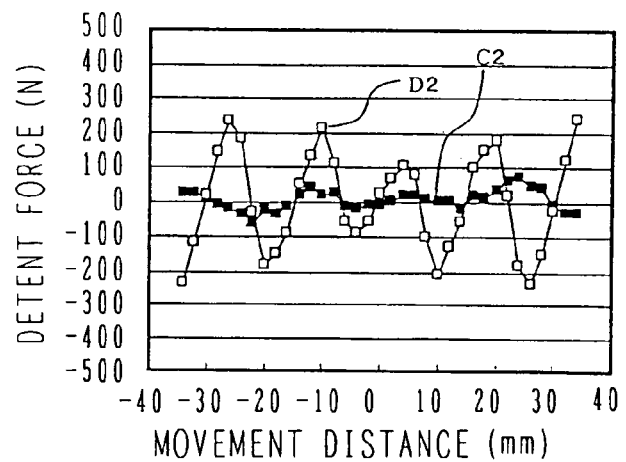

A horizontal axis in FIG. 10D denotes changes in movement distance (mm) of the movable element 10, and a vertical axis denotes cylindrical linear motor thrust value (N) calculations based on the magnetic field analyses. Line C2 in the figure represents a detent force waveform of the 5-pole 6-slot cylindrical linear motor having auxiliary salient poles 3c in the present embodiment. Also, line D2 represents a detent force waveform of the 4-pole 6-slot cylindrical linear motor having auxiliary salient poles 3c in the comparative example.

FIG. 10C indicates that whereas the 5-pole 6-slot cylindrical linear motor with auxiliary salient poles 3c in the present embodiment creates a flat detent force waveform, the 4-pole 6-slot cylindrical linear motor with auxiliary salient poles 3c in the comparative example creates a detent force waveform in which the higher-order pulsation components shown in FIG. 7C remain intact. That is to say, a significant difference in flatness also exists between both waveforms.

Although details are omitted, the same also applies to the 7-pole 6-slot cylindrical linear motor that is electrically a twin with respect to the 5-pole 6-slot cylindrical linear motor. In any cylindrical linear motor with even more poles that is constructed by repeatedly coupling the (6±1)-pole 6-slot cylindrical linear motor (basic unit of the magnetic circuit) in the axial direction of the movable element 10, thrust and detent force waveforms as flat as in FIGS. 10C, 10D, are also obtainable since superimposition of thrust for each basic unit provides total thrust.

As described above, according to the present embodiment, a cylindrical linear motor high in utilization efficiency of magnetic fluxes based on permanent magnets, and flat in thrust and detent force waveforms, can be provided by composing the magnetic circuit of the cylindrical linear motor so that when the salient poles of the stator in the motor are pitched at τs and the permanent magnets are pitched at τp, the relationship of τp:τs=6:6±1 is established, and by providing an auxiliary salient pole at both ends of the stator core.

Next, the configuration of a cylindrical linear motor according to a third embodiment of the present invention is described below using FIGS. 11 and 12.

Figure 11:
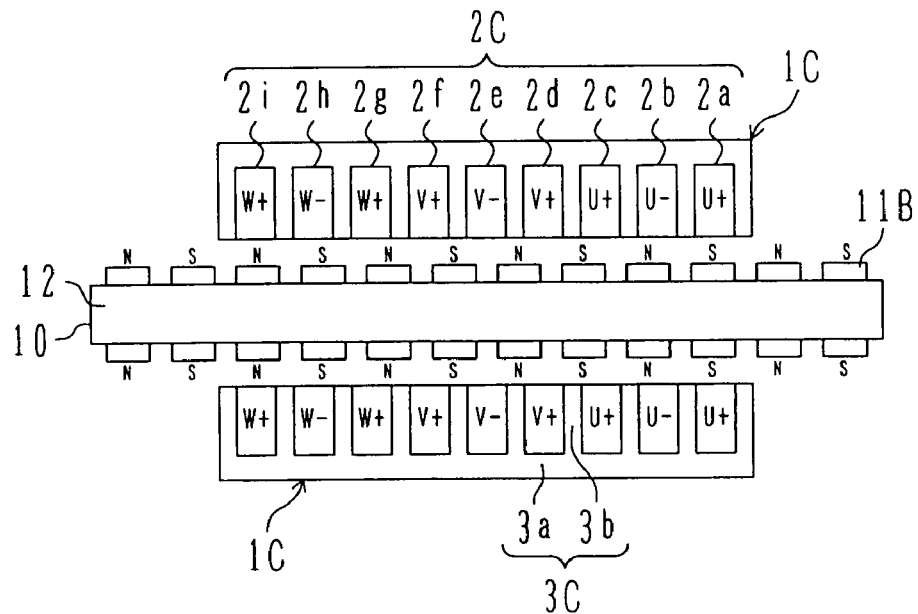
FIG. 11 is a cross-sectional view that shows the configuration of a magnetic circuit in a cylindrical linear motor according to a third embodiment of the present invention.

FIG. 11 is a cross-sectional view showing the configuration of a magnetic circuit in the cylindrical linear motor according to the third embodiment of the present invention. FIG. 12 is an explanatory diagram of induced voltages which occur in stator coil windings at a particular moment during a movement of a movable element at a constant speed in the cylindrical linear motor according to the third embodiment of the present invention. The same reference numbers and symbols as used in FIG. 1 denote the same sections shown therein.

Not only cylindrical linear motors with preferred features on the motor performance shown in FIGS. 7C, 7D, 10C, 10D, and on manufacturing efficiency of the motor, satisfy the relationship of τp:τs=6:6±1. According to theoretical studies on the synchronous type of cylindrical linear motor driven by three-phase AC power, all cylindrical linear motors satisfying a relationship of (1) have the foregoing features.

$$\tau p : \tau s = 3 \times n : 3 \times n \pm 1 \quad (n=2, 3, 4, 5, \ldots) \tag{1}$$

If n=2 is assigned in expression (1), this means that the (6±1)-pole 6-slot cylindrical linear motor described above will be constructed.

Expression (1) indicates that "3×n" slots or stator salient poles are present for "3×n±1" poles. In general, a (3×n±1)-pole, (3×n)-slot cylindrical linear motor forms the basic unit of the magnetic circuit and the motor itself does not form a basic unit of a magnetic circuit with a smaller number of poles and slots by repeating the basic unit.

FIG. 11 shows the configuration of a cylindrical linear motor constituted if n=3 is assigned in expression (1). In this case (n=3), it follows from expression (1) that τp:τs=9:9±1, so this indicates that (9±1)-pole 9-slot cylindrical linear motors are constructed as magnetic circuit basic units. These motors, as with the (6±1)-pole 6-slot cylindrical linear motors in the case of n=2, are electrically twins.

FIG. 11 shows the configuration of a magnetic circuit in an 8-pole 9-slot cylindrical linear motor. A stator 1C includes a stator coil winding 2C and a stator core 3C. The stator core 3C is formed by a stator core yoke 3a and stator core teeth 3b. Each of stator coil windings 2a-2i is disposed in each of nine slots formed by the stator core yoke 3a and the stator core teeth 3b. The stator coil winding 2C includes nine stator coil windings, namely, 2a (U+), 2b (U−), 2c (U+), 2d (V+), 2e (V−), 2f (V+), 2g (W+), 2h (W−), 2i (W+). Three adjacent stator coil windings 2a (U+), 2b (U−), 2c (U+) constitute a U-phase stator coil, three adjacent stator coil windings 2d (V+), 2e (V−), 2f (V+) constitute a V-phase stator coil, and three adjacent stator coil windings 2g (W+), 2h(W−), 2i (W+) constitute a W-phase stator coil. The coils of each phase need to be wound such that a direction of current in the adjacent windings is reversed in alternate fashion, at which time, the coils of the same phase can be continuously wound.

Figure 12:
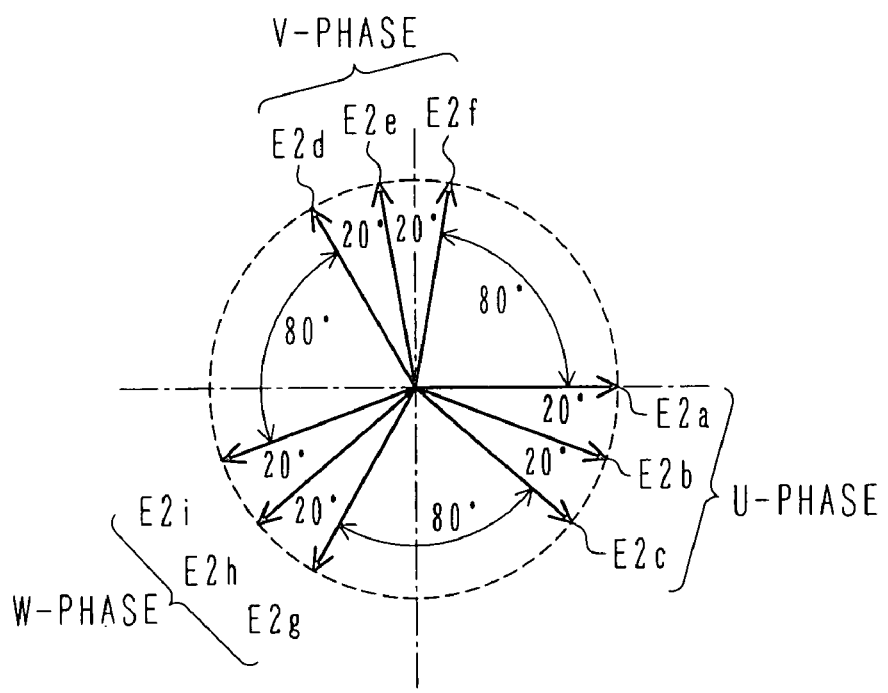
FIG. 12 is an explanatory diagram of induced voltages which occur in stator coil windings at a particular moment during a movement of a movable element at a constant speed in the cylindrical linear motor according to the third embodiment of the present invention.

FIG. 12 shows induced voltages E2a, E2b, E2c, E2d, E2e, E2f, E2g, E2h, and E2i that occur in the stator coil windings 2a (U+), 2b (U−), 2c (U+), 2d (V+), 2e (V−), 2f (V+), 2g (W+), 2h (W−), and 2i (W+), respectively, at a particular moment during a movement of a movable element 10 at a constant speed. The lengths of arrows in FIG. 12 indicate magnitudes of the induced voltages, and directions of the arrows indicate phases of the induced voltages. When paying attention to the U-phase, although the induced voltages E2a, E2b, E2c occurring in the stator coil windings 2a (U+), 2b (U−), 2c (U+) are of the same magnitude, phases of the induced voltages E2a, E2b, E2c are shifted by 20° in that order. The induced voltage occurring in the U-phase coil is a vectorial sum of the induced voltages E2a, E2b, E2c. Since the phases of the induced voltages E2a, E2b, E2c slightly differ at this time, higher-harmonic components included in the induced voltage waveform of the U-phase coil become relatively small in ratio. The same also applies to the induced voltages occurring in the V-phase coil and the W-phase coil. Consequently, as shown in FIG. 12, the induced voltages occurring in the U-phase, V-phase, and W-phase coils have a phase difference of 120 degrees from one another, so the cylindrical linear motor operates as a three-phase synchronous motor. In addition, since the induced voltages in each phase coil produce waveforms close to a sine wave, a smooth thrust waveform can be easily achieved.

Furthermore, thrust and detent force waveforms can be made flat by, as shown in FIGS. 8, 9, providing an auxiliary salient pole at both ends of the stator core 3C.

The magnetic circuit and induced voltages in the 8-pole 9-slot cylindrical linear motor have been described above. In terms of the layout of the stator coil winding 2 and the occurrence of an induced voltage in each winding, however, the same also applies to a 10-pole 9-slot cylindrical linear motor that is electrically a twin with respect to the 8-pole 9-slot motor.

In addition, similarly to the (6±1)-pole 6-slot cylindrical linear motor, repeatedly coupling the (9±1)-pole 9-slot cylindrical linear motor in the axial direction of the movable element 10 makes constructible a cylindrical linear motor with an even larger number of poles and slots. However, since the number of permanent magnets 11 in the basic unit of the magnetic circuit constituting the (9±1)-pole 9-slot cylindrical linear motor becomes even (8 or 10), there is no need to incorporate the winding-associated considerations discussed in FIG. 5 in connection with the reversal of the direction of current. This means that for the (9±1)-pole 9-slot cylindrical linear motor, the direction in which the current flows requires no changing when the basic unit of the magnetic circuit shown in FIG. 11 is repeatedly coupled.

As described above, according to the present embodiment, a cylindrical linear motor high in utilization efficiency of magnetic fluxes based on permanent magnets, and flat in thrust and detent force waveforms, can be provided by composing the magnetic circuit of the cylindrical linear motor so that when the salient poles of the stator in the motor are pitched at τs and the permanent magnets are pitched at τp, the relationship of τp:τs=9:9±1 is established, and by providing an auxiliary salient pole at both ends of the stator core.

Next, the configuration of a cylindrical linear motor according to a fourth embodiment of the present invention is described below using FIGS. 13 and 14.

Figure 13:
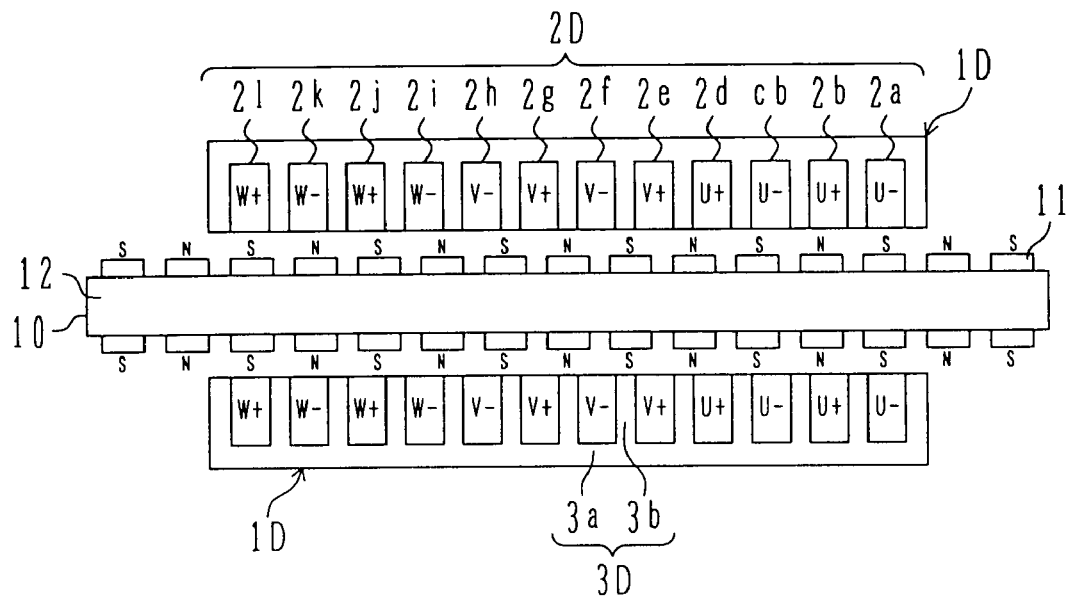
FIG. 13 is a cross-sectional view that shows the configuration of a magnetic circuit in a cylindrical linear motor according to a fourth embodiment of the present invention.

FIG. 13 is a cross-sectional view showing the configuration of a magnetic circuit in the cylindrical linear motor according to the fourth embodiment of the present invention. FIG. 14 is an explanatory diagram of induced voltages which occur in stator coil windings at a particular moment during a movement of a movable element at a constant speed in the cylindrical linear motor according to the fourth embodiment of the present invention. The same reference numbers and symbols as used in FIG. 1 denote the same sections shown therein.

FIG. 13 shows the configuration of a cylindrical linear motor constituted if n=4 is assigned in expression (1). In this case (n=4), it follows from expression (1) that τp:τs=12:12±1, so this indicates that (12±1)-pole 12-slot cylindrical linear motors are constructed as magnetic circuit basic units. These motors are electrically twins (layout of stator coil winding 2D and the way an induced voltage occurs in each of stator coil windings 2a to 2l are the same).

FIG. 13 shows the configuration of a magnetic circuit in an 11-pole 12-slot cylindrical linear motor. A stator 1D includes the stator coil winding 2D and a stator core 3D. The stator core 3D is formed by a stator core yoke 3a and stator core teeth 3b. Each of stator coil windings 2a-2l is disposed in each of 12 slots formed by the stator core yoke 3a and the stator core teeth 3b. The stator coil windings of a U-phase stator coil, for example, include four adjacent stator coil windings, namely, 2a (U−), 2b (U+), 2c (U−), 2d (U+), and can be a continuous winding. Both a V-phase stator coil and a W-phase stator coil are also constructed of the stator coil windings described above.

Figure 14:
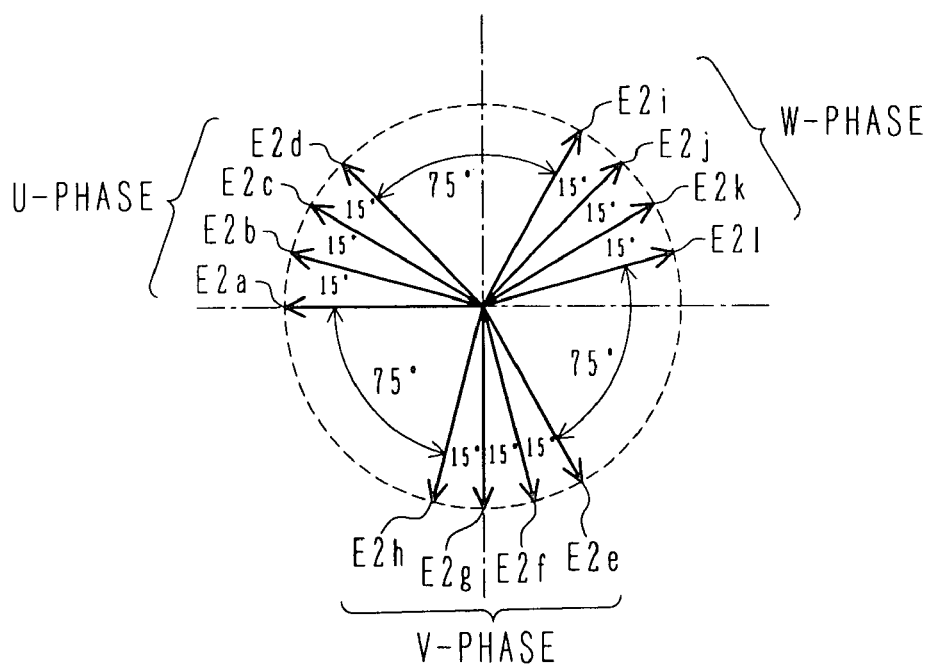
FIG. 14 is an explanatory diagram of induced voltages which occur in stator coil windings at a particular moment during a movement of a movable element at a constant speed in the cylindrical linear motor according to the fourth embodiment of the present invention.

FIG. 14 shows induced voltages that occur in the stator coil windings 2a-2l at a particular moment during a movement of a movable element 10 at a constant speed. When paying attention to the U-phase, although the induced voltages E2a, E2b, E2c, E2d occurring in the stator coil windings 2a (U−), 2b (U+), 2c (U−), 2d (U+) are of the same magnitude, phases of the induced voltages E2a, E2b, E2c, E2d are shifted by 15° in that order. The induced voltage occurring in the U-phase coil is a vectorial sum of the induced voltages E2a, E2b, E2c, E2d. At this time, for the reason discussed in FIG. 12, higher-harmonic components included in the induced voltage waveform of the U-phase coil are reduced, thus changing the induced voltage waveform into one close to a sine wave. The same also applies to the induced voltages occurring in the V-phase coil and the W-phase coil. Since the induced voltages occurring in the U-phase, V-phase, and W-phase coils have a phase difference of 120 degrees from one another, the cylindrical linear motor operates as a three-phase synchronous motor. In addition, since the induced voltages in each phase coil produce waveforms close to a sine wave, a smooth thrust waveform can be easily achieved.

Furthermore, thrust and detent force waveforms can be made flat by, as shown in FIGS. 8, 9, providing an auxiliary salient pole at both ends of the stator core 3D.

Besides, repeatedly coupling the (12±1)-pole 12-slot cylindrical linear motor in an axial direction of the movable element 10 makes constructible a cylindrical linear motor with an even larger number of poles and slots. However, since the number of permanent magnets 11 in the magnetic circuit basic unit of this motor becomes odd (11 or 13), there is a need to incorporate the winding-associated considerations discussed in FIG. 5 in connection with the reversal of the direction of current.

As described above, according to the present embodiment, a cylindrical linear motor high in utilization efficiency of magnetic fluxes based on permanent magnets, and flat in thrust and detent force waveforms, can be provided by composing the magnetic circuit of the cylindrical linear motor so that when the salient poles of the stator in the motor are pitched at τs and the permanent magnets are pitched at τp, the relationship of τp:τs=12:12±1 is established, and providing an auxiliary salient pole at both ends of the stator core.

Next, the configuration of a cylindrical linear motor according to a fifth embodiment of the present invention is described below using FIGS. 15 and 16.

Figure 15:
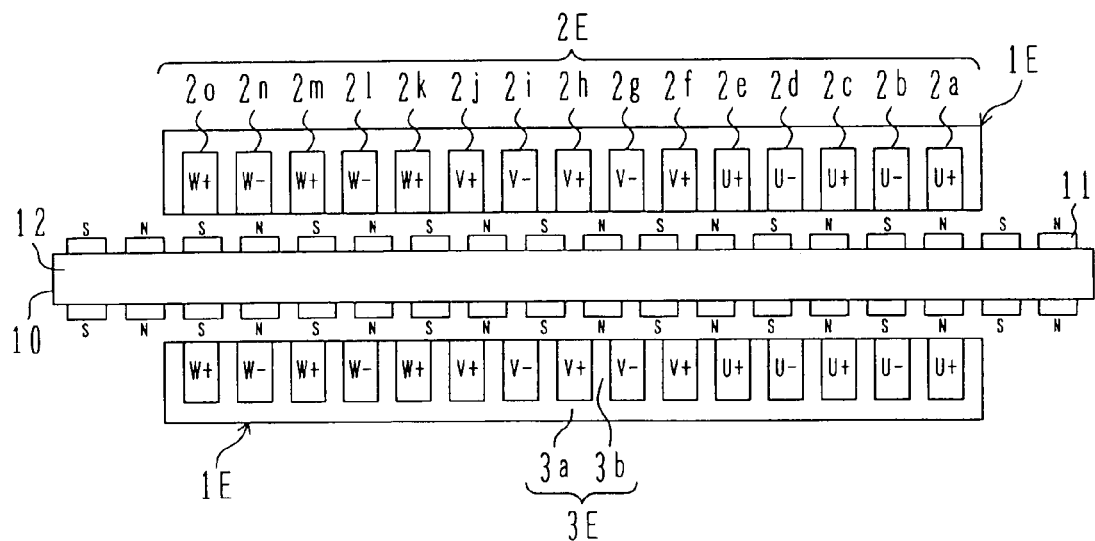
FIG. 15 is a cross-sectional view that shows the configuration of a magnetic circuit in a cylindrical linear motor according to a fifth embodiment of the present invention.

FIG. 15 is a cross-sectional view that shows the configuration of a magnetic circuit in the cylindrical linear motor according to the fifth embodiment of the present invention. FIG. 16 is an explanatory diagram of induced voltages which occur in stator coil windings at a particular moment during a movement of a movable element at a constant speed in the cylindrical linear motor according to the fifth embodiment of the present invention. The same reference numbers and symbols as used in FIG. 1 denote the same sections shown therein.

FIG. 15 shows a cylindrical linear motor (τp:τs=15:15±1) constructed if n=5 is assigned in expression (1). In this case (n=5), (15±1)-pole 15-slot cylindrical linear motors constitute magnetic circuit basic units. These motors are electrically twins (layout of stator coil winding 2E and the way an induced voltage occurs in each of stator coil windings 2a to 2o are the same).

FIG. 15 shows the configuration of a magnetic circuit in a 14-pole 15-slot cylindrical linear motor. A stator 1E includes the stator coil winding 2E and a stator core 3E. The stator core 3E is formed by a stator core yoke 3a and stator core teeth 3b. Each of stator coil windings 2a-2o is disposed in each of 15 slots formed by the stator core yoke 3a and the stator core teeth 3b. The stator coil windings of a U-phase stator coil, for example, include five adjacent stator coil windings, namely, 2a (U+), 2b (U−), 2c (U+), 2d (U−), 2e (U+), and can be a continuous winding. Both a V-phase stator coil and a W-phase stator coil are also constructed of the stator coil windings described above.

Figure 16:
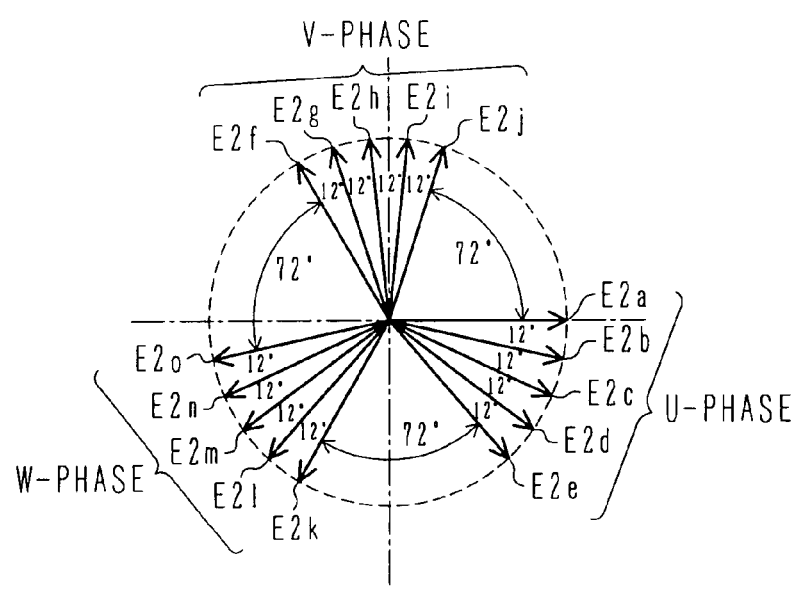
FIG. 16 is an explanatory diagram of induced voltages which occur in stator coil windings at a particular moment during a movement of a movable element at a constant speed in the cylindrical linear motor according to the fifth embodiment of the present invention.

FIG. 16 shows induced voltages that occur in the stator coil windings 2a-2o at a particular moment during a movement of a movable element 10 at a constant speed. When paying attention to the U-phase, although the induced voltages E2a, E2b, E2c, E2d, E2e occurring in the stator coil windings 2a (U+), 2b (U−), 2c (U+), 2d (U−), 2e (U+) are of the same magnitude, phases of the induced voltages E2a, E2b, E2c, E2d, E2e are shifted by 12° in that order. The induced voltage occurring in the U-phase coil is a vectorial sum of the induced voltages E2a, E2b, E2c, E2d, E2e. At this time, for the reason discussed in FIG. 12, higher-harmonic components included in the induced voltage waveform of the U-phase coil are reduced, thus changing the induced voltage waveform into one close to a sine wave. The same also applies to the induced voltages occurring in the V-phase coil and the W-phase coil. Since the induced voltages occurring in the U-phase, V-phase, and W-phase coils have a phase difference of 120 degrees from one another, the cylindrical linear motor operates as a three-phase synchronous motor. In addition, since the induced voltages in each phase coil appear as waveforms close to a sine wave, a smooth thrust waveform can be easily achieved.

Furthermore, thrust and detent force waveforms can be made flat by, as shown in FIGS. 8, 9, providing an auxiliary salient pole at both ends of the stator core 3E.

Besides, repeatedly coupling the (15±1)-pole 15-slot cylindrical linear motor in an axial direction of the movable element 10 makes constructible a cylindrical linear motor with an even larger number of poles and slots. However, since the number of permanent magnets 11 in the magnetic circuit basic unit of this motor becomes even (14 or 16), there is no need to incorporate the winding-associated considerations discussed in FIG. 5 in connection with the reversal of the direction of current. This means that for the (15±1)-pole 15-slot cylindrical linear motor, the direction in which the current flows requires no changing when the basic unit of the magnetic circuit shown in FIG. 15 is repeatedly coupled.

As described above, according to the present embodiment, a cylindrical linear motor high in utilization efficiency of magnetic fluxes based on permanent magnets, and flat in thrust and detent force waveforms, can be provided by composing the magnetic circuit of the cylindrical linear motor so that when the salient poles of the stator in the motor are pitched at τs and the permanent magnets are pitched at τp, the relationship of τp:τs=15:15±1 is established, and by providing an auxiliary salient pole at both ends of the stator core.

Detailed description of a cylindrical linear motor in which "n" is 6 or more is omitted herein. In all cylindrical linear motors that satisfy expression (1), however, since the stator coil windings 2a-2o that constitute the phase coils are arranged adjacently to each other, the in-phase coils can be continuously wound. Consequently, man-hour requirements for the coil-connecting operations are reduced, which, in turn, improves manufacturing efficiency of the motor. In addition, thrust and detent force pulsation components can be reduced as "n" in expression (1) becomes larger.

Next, the configuration of a cylindrical linear motor according to a sixth embodiment of the present invention is described below using FIGS. 17 and 18.

Figure 17:
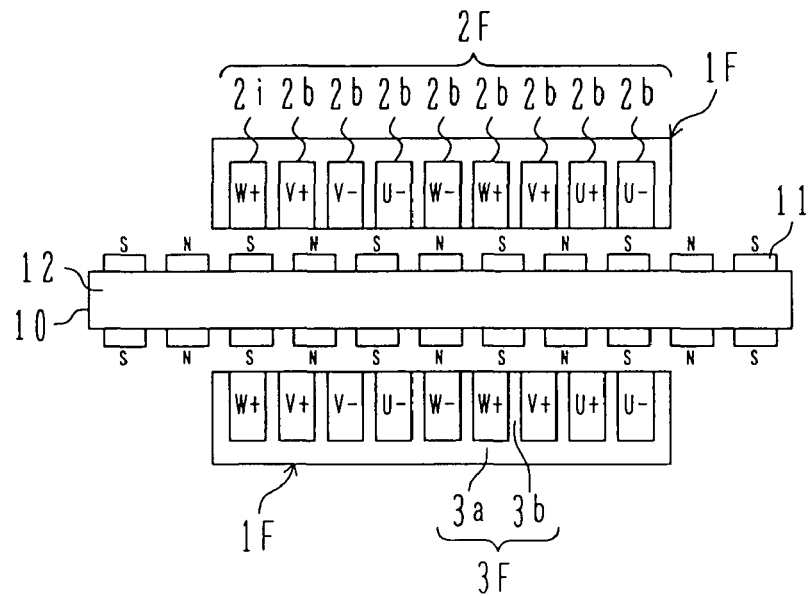
FIG. 17 is a cross-sectional view that shows the configuration of a magnetic circuit in a cylindrical linear motor according to a sixth embodiment of the present invention.

FIG. 17 is a cross-sectional view showing the configuration of a magnetic circuit in the cylindrical linear motor according to the sixth embodiment of the present invention. FIG. 18 is an explanatory diagram of induced voltages which occur in stator coil windings at a particular moment during a movement of a movable element at a constant speed in the cylindrical linear motor according to the sixth embodiment of the present invention. The same reference numbers and symbols as used in FIG. 1 denote the same sections shown therein.

The cylindrical linear motors used in the case where the difference between the number of poles and that of slots is 1 in the magnetic circuit basic unit of the motor have been shown in FIGS. 1 to 16. According to the theoretical studies on the synchronous type of cylindrical linear motor driven by three-phase AC power, cylindrical linear motors that satisfy the following relational expressions, for instance, can be constructed in addition to the cylindrical linear motors satisfying expression (1):

$$\tau p:\tau s=3\times n:3\times n\pm 2 \ (n=3, 5, 7, 9, \ldots) \tag{2}$$

$$\tau p:\tau s=3\times n:3\times n\pm 4 \ (n=5, 7, 9, 11, \ldots) \tag{3}$$

$$\tau p:\tau s=3\times n:3\times n\pm 5 \ (n=6, 7, 8, 9, \ldots) \tag{4}$$

$$\tau p:\tau s=3\times n:3\times n\pm 7 \ (n=8, 9, 10, 11, \ldots) \tag{5}$$

Expression (2) indicates that a (3×n±2)-pole (3×n)-slot cylindrical linear motor constitutes a basic unit of its magnetic circuit, and expression (3) indicates that a (3×n±4)-pole (3×n)-slot cylindrical linear motor constitutes a basic unit of its magnetic circuit. Similarly, expressions (4), (5) indicate that a (3×n±5)-pole (3×n)-slot cylindrical linear motor and a (3×n±7)-pole (3×n)-slot cylindrical linear motor constitute basic units of respective magnetic circuits.

Of all cylindrical linear motors that satisfies either of these expressions, the cylindrical linear motor series that satisfies expression (2) has the second highest practical value, next to the cylindrical linear motor series that satisfies expression (1). The cylindrical linear motor series that satisfies expression (2) are described in detail hereunder using FIGS. 17, 18.

FIG. 17 shows a cylindrical linear motor constituted if n=3 is assigned in expression (2). In this case, it follows from expression (2) that τp:τs=9:9±2, so this indicates that (9±2)-pole 9-slot cylindrical linear motors are constructed as the magnetic circuit basic units. The two kinds of motors are electrically twins in terms of the layout of stator coil winding 2F and the way an induced voltage occurs in each of stator coil windings 2a-2i.

FIG. 17 shows the configuration of a magnetic circuit in a 7-pole 9-slot cylindrical linear motor. A stator 1F includes a stator coil winding 2F and a stator core 3F. The stator core 3F is formed by a stator core yoke 3a and stator core teeth 3b. Each of stator coil windings 2a-2i is disposed in each of nine slots formed by the stator core yoke 3a and the stator core teeth 3b. The stator coil winding 2F includes nine stator coil windings, namely, 2a (U−), 2b (U+), 2c (V+), 2d (W+), 2e (W−), 2f (U−), 2g (V−), 2h (V+), 2i (W+). The stator coil windings 2a (U−), 2b (U+), 2f (U−) constitute a U-phase stator coil, the stator coil windings 2c (V+), 2g (V−), 2h (V+) constitute a V-phase stator coil, and the stator coil windings 2d (W+), 2e (W−), 2i (W+) constitute a W-phase stator coil. Unlike the cylindrical linear motors that satisfy expression (1), the 7-pole 9-slot cylindrical linear motor does not require adjacent layout of the stator coil windings 2a-2i constituting the phase coils. Instead, a tie wire is required for interconnecting the coils of the same phase.

Figure 18:
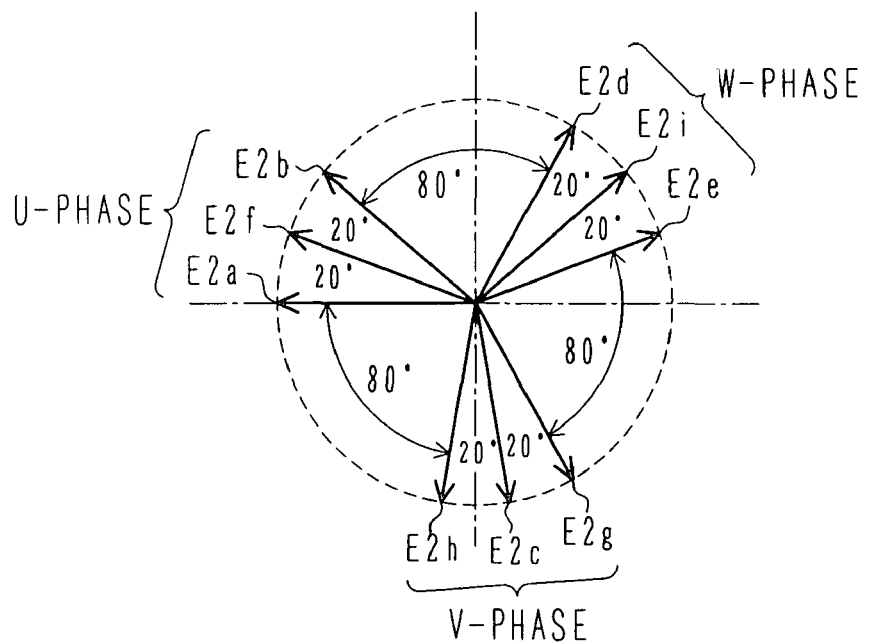
FIG. 18 is an explanatory diagram of induced voltages which occur in stator coil windings at a particular moment during a movement of a movable element at a constant speed in the cylindrical linear motor according to the sixth embodiment of the present invention.

FIG. 18 shows induced voltages E2a, E2b, E2c, E2d, E2e, E2f, E2g, E2h, and E2i that occur in the stator coil windings 2a (U−), 2b (U+), 2c (V+), 2d (W+), 2e (W−), 2f (U−), 2g (V−), 2h (V+), and 2i (W+), respectively, at a particular moment during a movement of a movable element 10 at a constant speed. When paying attention to the U-phase, although the induced voltages E2*a*, E2*b*, E2*f* occurring in the stator coil windings 2*a* (U−), 2*b* (U+), 2*f* (U−) are of the same magnitude, phases of the induced voltages E2*a*, E2*f*, E2*b* are shifted by 20° in that order. The induced voltage occurring in the U-phase coil is a vectorial sum of the induced voltages E2*a*, E2*b*, E2*f*. The same also applies to the induced voltages occurring in the V-phase coil and the W-phase coil. The way these induced voltages occur is exactly the same as for the 8-pole 9-slot cylindrical linear motor described in FIG. 11. Since higher-harmonic components included in the induced voltage waveform of each U-phase coil, therefore, become relatively small in ratio, the induced voltage waveforms become close to a sine wave and as a result, a smooth thrust waveform can be easily achieved.

Furthermore, thrust and detent force waveforms can be made even more flat by, as shown in FIGS. 8, 9, providing an auxiliary salient pole at both ends of the stator core 3F.

As described above, according to the present embodiment, a cylindrical linear motor high in utilization efficiency of magnetic fluxes based on permanent magnets, and flat in thrust and detent force waveforms, can be provided by composing the magnetic circuit of the cylindrical linear motor so that when the salient poles of the stator in the motor are pitched at $\tau s$ and the permanent magnets are pitched at $\tau p$, the relationship of $\tau p:\tau s=15:15\pm1$ is established, and by providing an auxiliary salient pole at both ends of the stator core.

Next, the configuration of a cylindrical linear motor according to a seventh embodiment of the present invention is described below using FIGS. 19 and 20.

Figure 19:
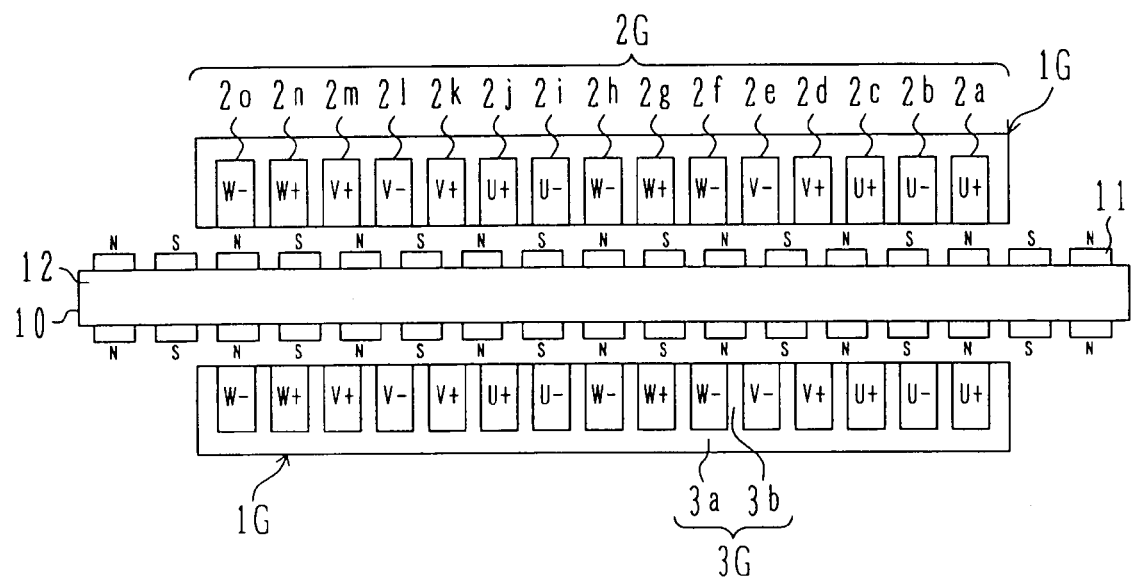
FIG. 19 is a cross-sectional view that shows the configuration of a magnetic circuit in a cylindrical linear motor according to a seventh embodiment of the present invention.
Figure 20:
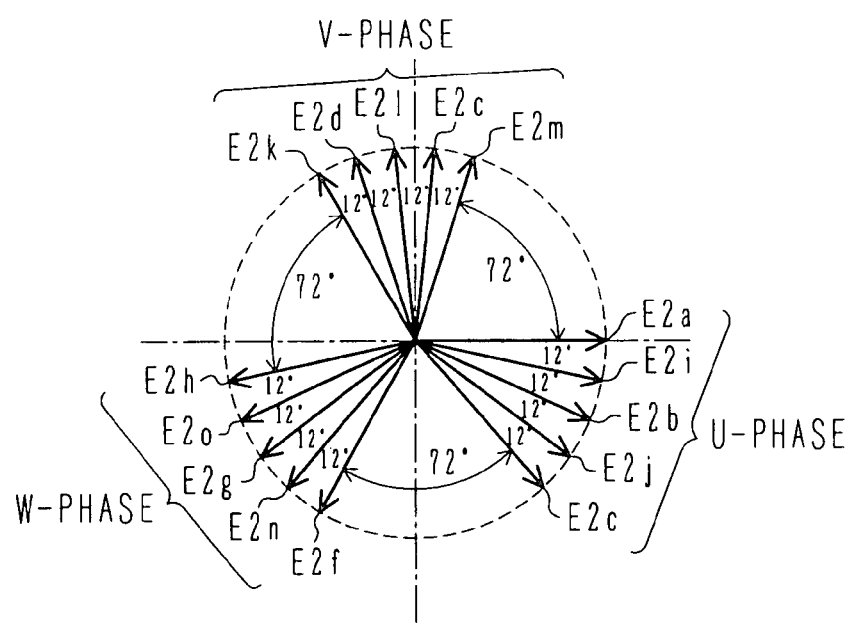
FIG. 20 is an explanatory diagram of induced voltages which occur in stator coil windings at a particular moment during a movement of a movable element at a constant speed in the cylindrical linear motor according to the seventh embodiment of the present invention.

FIG. 19 is a cross-sectional view that shows the configuration of a magnetic circuit in the cylindrical linear motor according to the seventh embodiment of the present invention. FIG. 20 is an explanatory diagram of induced voltages which occur in stator coil windings at a particular moment during a movement of a movable element at a constant speed in the cylindrical linear motor according to the seventh embodiment of the present invention. The same reference numbers and symbols as used in FIG. 1 denote the same sections shown therein.

FIG. 19 shows a cylindrical linear motor constituted if n=5 is assigned in expression (2). In this case, it follows from expression (2) that $\tau p:\tau s=15:15\pm2$, so this indicates that (15±2)-pole 15-slot cylindrical linear motors are constructed as magnetic circuit basic units. The two kinds of motors are electrically twins.

FIG. 19 shows the configuration of a magnetic circuit in a 13-pole 15-slot cylindrical linear motor. A stator 1G includes a stator coil winding 2G and a stator core 3G. The stator core 3G is formed by a stator core yoke 3*a* and stator core teeth 3*b*. Each of stator coil windings 2*a*-2*o* is disposed in each of nine slots formed by the stator core yoke 3*a* and the stator core teeth 3*b*. For instance, a U-phase stator coil includes the stator coil windings 2*a* (U+), 2*b* (U−), 2*c* (U+), 2*i* (U−), 2*f* (U+). Unlike the cylindrical linear motors that satisfy expression (1), the 13-pole 15-slot cylindrical linear motor does not require adjacent layout of the stator coil windings 2*a*-2*o* constituting the phase coils. Instead, a tie wire is required for interconnecting the coils of the same phase. V-phase and W-phase stator coils are also of the same stator coil winding construction as the above.

FIG. 19 shows induced voltages that occur in stator coil windings at a particular moment during a movement of a movable element 10 at a constant speed. When paying attention to the U-phase, although the induced voltages E2*a*, E2*b*, E2*c*, E2*i*, E2*j* occurring in the stator coil windings 2*a* (U+), 2*b* (U−), 2*c* (U+), 2*i* (U−), 2*j* (U+) are of the same magnitude, phases of the induced voltages E2*a*, E2*i*, E2*b*, E2*j*, E2*c* are shifted by 12° in that order. The induced voltage occurring in the U-phase coil is a vectorial sum of the induced voltages E2*a*, E2*b*, E2*c*, E2*d*, E2*e*. The same also applies to the induced voltages occurring in the V-phase coil and the W-phase coil. The way these induced voltages occur is exactly the same as for the 14-pole 15-slot cylindrical linear motor described in FIG. 15. Since higher-harmonic components included in the induced voltage waveform of each U-phase coil, therefore, become relatively small in ratio, the induced voltage waveforms become close to a sine wave and as a result, a smooth thrust waveform can be easily achieved.

Furthermore, thrust and detent force waveforms can be made even more flat by, as shown in FIGS. 8, 9, providing an auxiliary salient pole at both ends of the stator core 3G.

As described above, according to the present embodiment, a cylindrical linear motor high in utilization efficiency of magnetic fluxes based on permanent magnets, and flat in thrust and detent force waveforms, can be provided by composing the magnetic circuit of the cylindrical linear motor so that when the salient poles of the stator in the motor are pitched at $\tau s$ and the permanent magnets are pitched at $\tau p$, the relationship of $\tau p:\tau s=15:15\pm1$ is established, and by providing an auxiliary salient pole at both ends of the stator core.

While the cylindrical linear motors used in the case where "n" is 3 or 5 in expression (2) have been described above, not all stator coil windings that constitute each phase coil in the cylindrical linear motors constructed if "n" is 7 or more are arranged adjacently to each other. Instead, a tie wire is required for interconnecting the coils of the same phase. However, since the induced voltage waveforms become close to a sine wave, a smooth thrust waveform can be easily achieved.

If any cylindrical linear motor (magnetic circuit basic unit) that satisfies expression (2) is repeatedly coupled in an axial direction of the movable element 10 similarly to a cylindrical linear motor that satisfies expression (1), a cylindrical linear motor with an even larger number of poles and slots can be constructed. The number of permanent magnets 11 in the basic unit of the magnetic circuit in this case, however, is always fixed at an odd number, irrespective of "n". It is therefore necessary that when the basic unit of the magnetic circuit is repeatedly coupled in the axial direction, the way the coils are wound needs to be considered so that a direction in which a current flows is reversed.

For the cylindrical linear motors (magnetic circuit basic units) associated with expressions (3), (4), (5), that is, the (3×n±4)-pole (3×n)-slot cylindrical linear motors, the (3×n±5)-pole (3×n)-slot cylindrical linear motors, and the (3×n±7)-pole (3×n)-slot cylindrical linear motors, although detailed description is omitted, since these motors, compared with the conventional cylindrical linear motors, generate induced voltage waveforms close to a sine wave, smooth thrust waveforms can be easily achieved.

Next, cylindrical linear motor configurations according to the present invention are described below using FIG. 21.

FIG. 21 is an explanatory diagram of the cylindrical linear motor configurations according to the present invention.

In FIG. 21, the number of slots, M, is plotted in a horizontal direction and the number of poles, P, in a vertical direction. Cylindrical linear motors with up to 30 slots and up to 21 poles, are collectively listed in a code-classified format.

Symbol C represents the cylindrical linear motors (magnetic circuit basic units) according to the present invention. Underscored character C indicates that when the basic unit of the magnetic circuit is repeatedly coupled, there is a need to reverse the direction in which the current flows through the coil. A superscript and a subscript of Character C indicate a difference between the number of poles and that of slots, and the number "n" in the foregoing relational expression, respectively. A number immediately previous to Character C denotes a repetition count of the basic unit in the particular motor of the present invention. For example, "4C" means that C is repeated four times. In the list, a square and a rhomboid are assigned to the cylindrical linear motors described as comparative examples above. The square denotes a 2-pole 3-slot cylindrical linear motor (magnetic circuit basic unit), and the rhomboid denotes a 4-pole 3-slot motor. Each of values immediately previous to the squares and the rhomboids denotes a repetition count of the basic unit in the motor of the comparative example. "3-phase motor N/A" indicates that the pole-slot arrangement is not available (not established) for a three-phase motor.

The list shown in FIG. 21 contains all embodiments of cylindrical linear motors (magnetic circuit basic units) that have hitherto been described using the accompanying drawings. For example, code C2−1 signifies the 5-pole 6-slot cylindrical linear motor described using FIG. 1, and code C2−1 signifies the 7-pole 6-slot cylindrical linear motor that is electrically a twin with respect to the motor represented by code C2−1. Such cylindrical linear motors as represented by, for example, code C2−1 or C2+1, and other cylindrical linear motors constructed by repeating the basic unit of the magnetic circuit in the axial direction are also covered in FIG. 21.

As is obvious from FIG. 21, ratio M/P between the number of slots, M, and that of poles, P, in any cylindrical linear motor (magnetic circuit basic unit) according to the present invention, is greater than 3/4 and smaller than 3/2. Briefly, the ratio M/P satisfies the following relationship:

$$3/4 < M/P < 3/2 \tag{6}$$

On the other hand, since a relationship of $P \times \tau p = M \times \tau s$ is established between the pitch $\tau s$ of the stator salient poles $3b$ and the pitch $\tau p$ of the permanent magnets 11, the ratio between the pitches $\tau s$ and $\tau p$ in the cylindrical linear motor according to the present invention satisfies the following relationship:

$$3/4 < \tau p / \tau s < 3/2 \tag{7}$$

Expression (7) is a relational expression important for characterizing the cylindrical linear motor according to the present invention. While the configurations and advantageous effects of the cylindrical linear motor according to the present invention have been described above in association with expressions (1) to (5), this cylindrical linear motor can be re-described as a motor whose magnetic circuit is composed so as to satisfy expression (7). That is to say, the cylindrical linear motor that satisfies expression (7) can provide preferred thrust, compared with the cylindrical linear motors using the conventional techniques. In addition, a better detent force waveform can be achieved by disposing an auxiliary salient pole at both ends of the stator core.

Next, the configuration of an electromagnetic suspension according to any one of the embodiments of the present invention is described below using FIGS. 22 to 24. An electromagnetic suspension for an automobile is described as an example below.

FIG. 22 is a system block diagram showing the configuration of the electromagnetic suspension according to any one of the embodiments of the present invention. FIG. 23 is a block diagram that shows essential elements of the electromagnetic suspension according to any one of the embodiments of the present invention. FIG. 24 is a block diagram showing the configuration of a driver circuit used in the electromagnetic suspension according to any one of the embodiments of the present invention.

The electromagnetic suspension in FIG. 22 includes suspension units 100FL, 100FR, 100RL, 100RR, and drivers 300 (300FL, 300FR, 300RL, 300RR) each for driving a cylindrical linear motor. The suspension units 100FL, 100FR, 100RL, 100RR each include the cylindrical linear motor, a configuration of which is as shown in FIG. 1.

The suspension unit 100FL is mounted between a member near a front left wheel, and a vehicle body, and the suspension unit 100FR is mounted between a member near a front right wheel, and the vehicle body. The suspension unit 100RL is mounted between a member near a rear left wheel, and the vehicle body, and the suspension unit 100RR is mounted between a member near a rear right wheel, and the vehicle body.

The drivers 300FL, 300FR, 300RL, 300RR are arranged in suspension towers associated with each wheel. Each driver 300 (300FL, 300FR, 300RL, 300RR) has a connected 36-VDC high-voltage power supply (battery) BH.

The driver 300 is connected to a suspension control unit (SCU) 200 via a CAN bus. In order to conduct vibration suppression of the vehicle and/or attitude control thereof, the SCU 200 outputs a driving command to the driver 300 and controls propulsion force generated by the internal cylindrical linear motor of the suspension unit 100FL, 100FR, 100RL, 100RR. For the same purposes as those mentioned above, the SCU 200 also uses electromotive force of the cylindrical linear motor to control damping force of the vehicle.

First, second, and third vertical acceleration sensors 210A, 210B, and 210C, each adapted for detecting a vertical vibration of the vehicle body, a wheel velocity sensor 220 for detecting a velocity of the wheel, a steering wheel angle sensor 230 for detecting a rotational angle of a steering wheel, and a brake sensor 240 for detecting whether a brake pedal has been stepped on are connected to the SCU 200. The first vertical acceleration sensor 210A is disposed on the suspension tower for the front right wheel, the second vertical acceleration sensor 210B is disposed on the suspension tower for the front left wheel, and the third vertical acceleration sensor 210C is disposed in a luggage compartment at the rear of the vehicle body.

In accordance with signals from the first, second, and third vertical acceleration sensors 210A, 210B, and 210C, from the wheel velocity sensor 220, the steering wheel angle sensor 230, and the brake sensor 240, and from stroke sensor 190 described in FIG. 1, the SCU 200 determines a controlled variable for the suspension units 100FL, 100FR, 100RL, 100RR of each wheel so as to suppress the vibration of the vehicle, changes in the attitude thereof, and unstable behavior thereof, and so as to increase stability of the vehicle against the vehicle speed and any steering operations and braking operations of a driving person. After the determination, the SCU 200 outputs an appropriate driving signal of the cylindrical linear motor to the driver 300.

Next, a configuration of the driver 300 is described below using FIGS. 23, 24.

Figure 23:
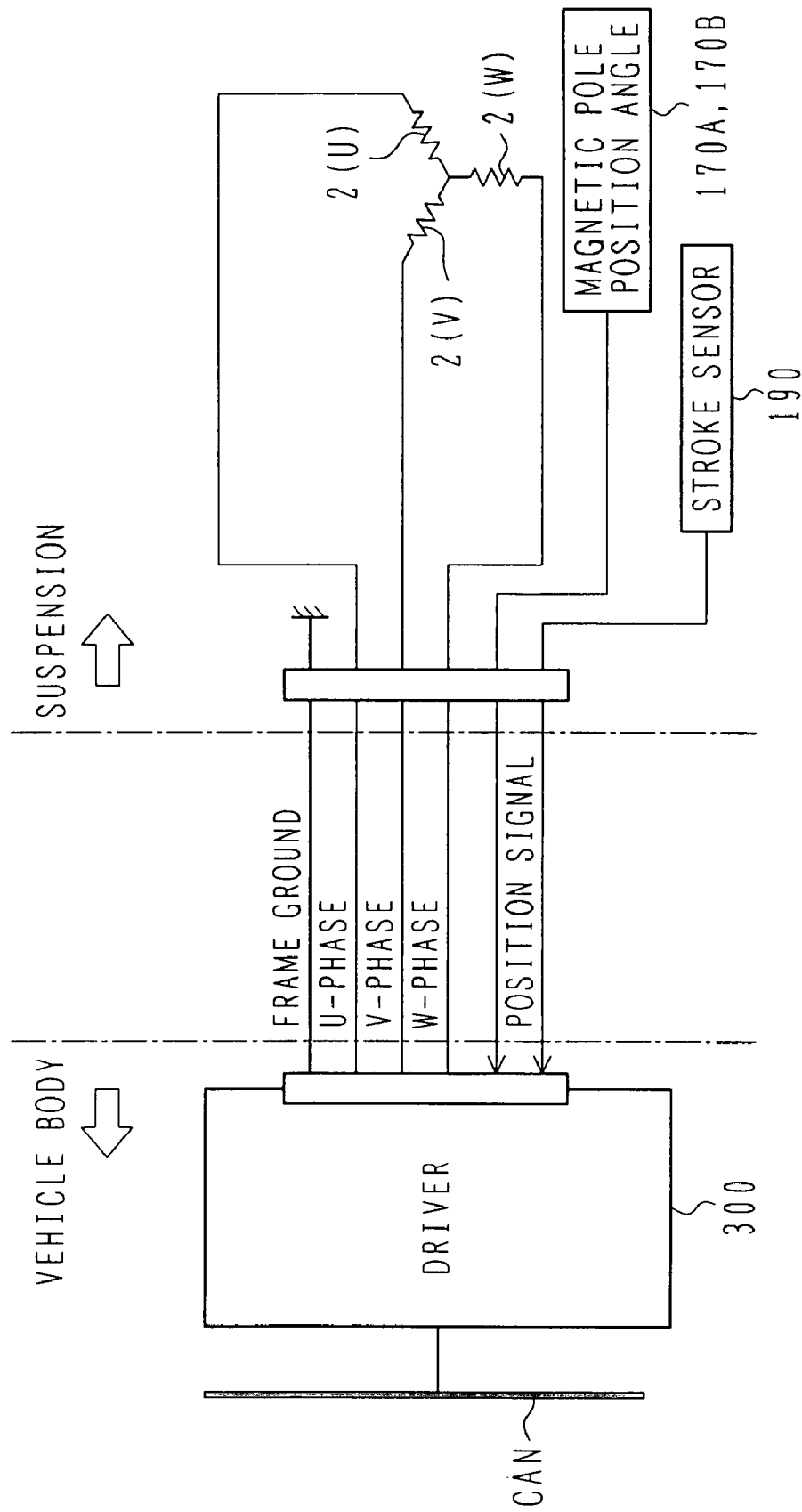
FIG. 23 is a block diagram that shows essential elements of the electromagnetic suspension according to any one of the embodiments of the present invention.

As shown in FIG. 23, a U-phase coil (stator coil winding) 2 (U), V-phase coil (stator coil winding) 2 (V), and W-phase coil (stator coil winding) 2 (W) of the cylindrical linear motor are Y-connected. The driver 300 supplies U-phase, V-phase, and W-phase driving currents to the respective phase coils. Magnetic pole position signals that have been detected by magnetic pole position sensors 170A, 170B, are input to the driver 300. A stroke signal that has been detected by the stroke sensor 190 is supplied to the driver 300 and then input to the SCU 200 via the CAN bus.

Figure 24:
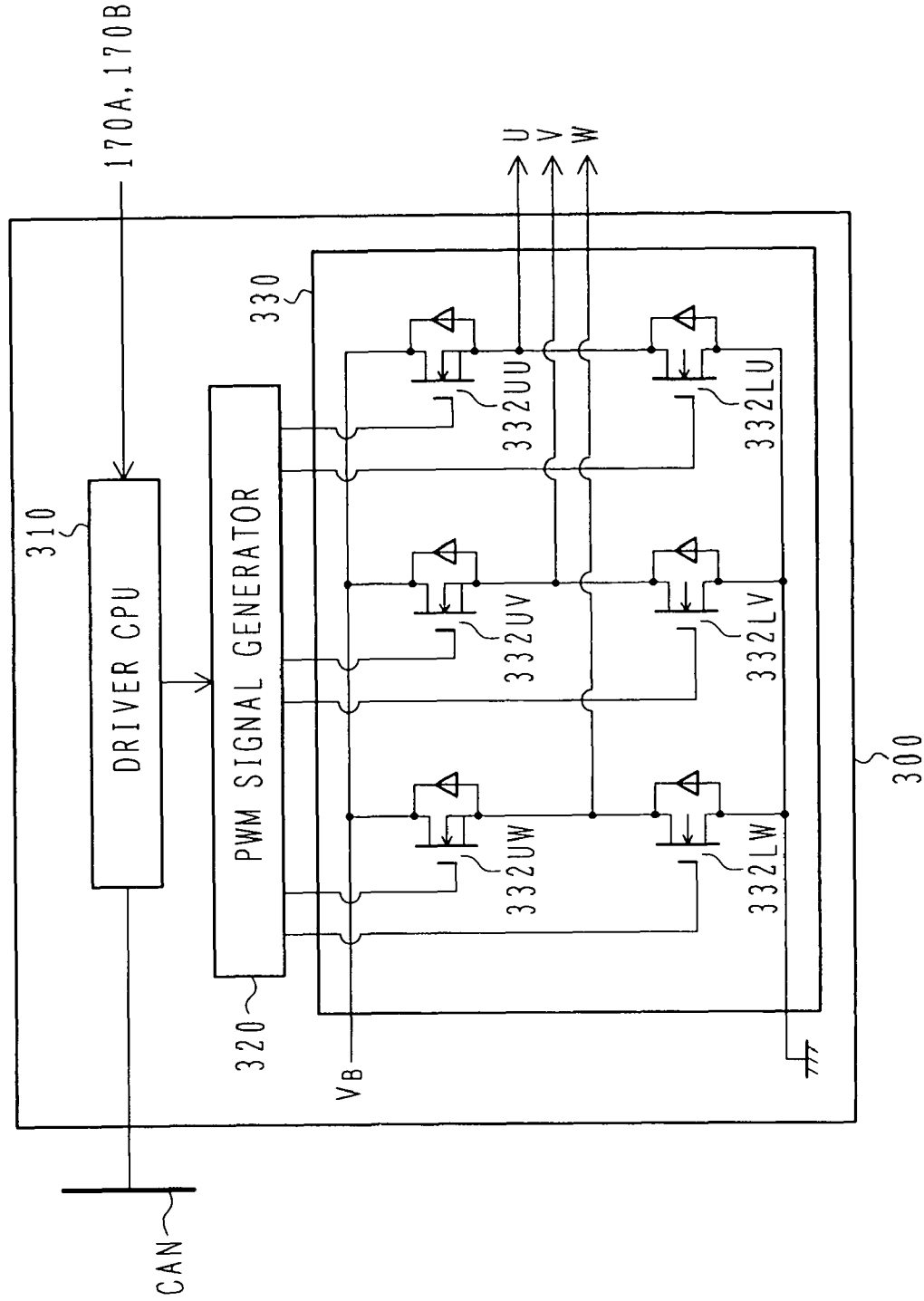
FIG. 24 is a block diagram that shows the configuration of a driver circuit used in the electromagnetic suspension according to any one of the embodiments of the present invention.

As shown in FIG. 24, the driver 300 includes a driver CPU 310, a PWM signal generator 320, and a semiconductor switching element 330. The semiconductor switching element 330 includes a U-phase upper-arm MOS-FET 332UU, a U-phase lower-arm MOS-FET 332LU, a V-phase upper-arm MOS-FET 332UV, a V-phase lower-arm MOS-FET 332LV, a W-phase upper-arm MOS-FET 332UW, and a W-phase lower-arm MOS-FET 332LW. In accordance with the suspension-driving command from the SCU 200, the driver CPU 310 outputs a control signal for PWM driving of the semiconductor switching element 330, to the PWM signal generator 320 via the CAN bus. On the basis of the control signal from the driver CPU 310, the PWM signal generator 320 then supplies an on/off driving signal to gates of each MOS-FET constituting the semiconductor switching element 330.

What is claimed is:

1. A cylindrical linear motor comprising:

a stator;

a movable element disposed via a clearance with respect to the stator, said movable element being adapted to move in a rectilinear moving direction with respect to said stator;

wherein:

said stator includes a stator core having stator salient poles and includes a three-phase stator coil winding inserted within a slot formed in said stator core, said movable element includes a plurality of ring-shaped permanent magnets fixed to a movable element core, and said stator salient poles are pitched at $\tau s$ and said permanent magnets are pitched at $\tau p$ to establish a relationship of $3/4 < \tau p/\tau s < 3/2$; and a plurality of hollow portions formed on said movable element core along an axis of a movable element moving direction at a predetermined interval; wherein said permanent magnets are provided at said plurality of hollow portions formed on said movable element core, respectively;

each of said permanent magnets is comprised of a plurality of said divided permanent magnets, and is magnetized in a radial direction relative to the ring so as to have reverse polarity along the movable element moving direction;

wherein each coil winding of said three-phase stator coil winding has a plurality of coil windings, and stator coils are wound in the same direction.

2. A cylindrical linear motor comprising:

a stator;

a movable element disposed via a clearance with respect to the stator, said movable element being adapted to move in a rectilinear moving direction with respect to said stator;

wherein:

said stator includes a stator core having stator salient poles and includes a three-phase stator coil winding inserted within a slot formed in said stator core, said movable element includes a plurality of ring-shaped permanent magnets fixed to a movable element core, and said stator salient poles are pitched at $\tau s$ and said permanent magnets are pitched at $\tau p$ to establish a relationship of $3/4 < \tau p/\tau s < 3/2$; and a plurality of hollow portions formed on said movable element core along an axis of a movable element moving direction at a predetermined interval; wherein said permanent magnets are provided at said plurality of hollow portions formed on said movable element core, respectively;

each of said permanent magnets is comprised of a plurality of said divided permanent magnets, and is magnetized in a radial direction relative to the ring so as to have reverse polarity along the movable element moving direction;

wherein a perimeter side of said movable element core has a round configuration as viewed in a section perpendicular to an axis of the movable element moving direction;

said stator salient pole of said movable element core provides the round configuration in the section perpendicular to the axis of said movable element moving direction and at the side of the movable element, and faces the circular movable element's perimeter side;

auxiliary salient poles are provided in both ends of said movable element core;

said auxiliary salient poles have a circular configuration in a section perpendicular to the axis of the movable element moving direction and at the side of the movable element, has countered the circular movable element's perimeter side; and said auxiliary salient poles extend in the same radial direction along the movable element's perimeter side and in a direction away from movable element's perimeter side gradually at the side of the movable element.

3. A cylindrical linear motor comprising:

a stator;

a movable element disposed via a clearance with respect to the stator, said movable element being adapted to move in a rectilinear moving direction with respect to said stator;

wherein:

said stator includes a stator core having stator salient poles and includes a three-phase stator coil winding inserted within a slot formed in said stator core, said movable element includes a plurality of ring-shaped permanent magnets fixed to a movable element core, and said stator salient poles are pitched at $\tau s$ and said permanent magnets are pitched at $\tau p$ to establish a relationship of $3/4 < \tau p/\tau s < 3/2$; and a plurality of hollow portions formed on said movable element core along an axis of a movable element moving direction at a predetermined interval; wherein said permanent magnets are provided at said plurality of hollow portions formed on said movable element core, respectively;

each of said permanent magnets is comprised of a plurality of said divided permanent magnets, and is magnetized in a radial direction relative to the ring so as to have reverse polarity along the movable element moving direction;

wherein a perimeter side of said movable element core has a round configuration as viewed in a section perpendicular to the axis of the movable element moving direction;

said stator salient pole of said movable element core has the round configuration in the section perpendicular to the axis of said movable element moving and at the side of the movable element, and faces the circular movable element's perimeter side;

auxiliary salient poles are provided in both ends of said movable element core;

said auxiliary salient poles have circular configuration in a section perpendicular to the axis of the movable element moving direction and at the side of the movable element, and faces the circular movable element's perimeter side;

said auxiliary salient poles extends along the movable element's perimeter side and in a gradually direction tapering away from the movable element's perimeter side; and the length of said auxiliary salient pole in the direction of the axis of the movable element moving direction is shorter than an axial length of the ring-like permanent magnet.

4. A cylindrical linear motor comprising:

a stator;

a movable element disposed via a clearance with respect to the stator, said movable element being adapted to move in a rectilinear moving direction with respect to said stator;

wherein:

said stator includes a stator core having stator salient poles and includes a three-phase stator coil winding inserted within a slot formed in said stator core, said movable element includes a plurality of ring-shaped permanent magnets fixed to a movable element core, and said stator salient poles are pitched at $\tau s$ and said permanent magnets are pitched at $\tau p$ to establish a relationship of $3/4 < \tau p/\tau s < 3/2$; and a plurality of hollow portions formed on said movable element core along an axis of a movable element moving direction at a predetermined interval; wherein said permanent magnets are provided at said plurality of hollow portions formed on said movable element core, respectively;

each of said permanent magnets is comprised of a plurality of said divided permanent magnets, and is magnetized in a radial direction relative to the ring so as to have reverse polarity along the movable element moving direction;

wherein auxiliary salient poles are provided at both ends of said movable element core and extend in the same radial direction along a movable element's perimeter side with a length of $(d0/2+d2)$ which is longer than a half of the length $(d0)$ of said stator salient poles and is directed away from movable element's perimeter side gradually at the side of the movable element, where $d2$ represents an axial length of contact faces of the auxiliary salient poles with respect to said stator core.

* * * * *